(12) United States Patent
Nepomniachtchi et al.

(10) Patent No.: US 12,125,302 B2
(45) Date of Patent: Oct. 22, 2024

(54) SYSTEMS AND METHODS FOR CLASSIFYING PAYMENT DOCUMENTS DURING MOBILE IMAGE PROCESSING

(71) Applicant: Mitek Systems, Inc., San Diego, CA (US)

(72) Inventors: Grigori Nepomniachtchi, San Diego, CA (US); Vitali Kliatskine, San Diego, CA (US); Nikolay Kotovich, San Diego, CA (US)

(73) Assignee: Mitek Systems, Inc., San Diego, CA (US)

( * ) Notice: Subject to any disclaimer, the term of this patent is extended or adjusted under 35 U.S.C. 154(b) by 506 days.

(21) Appl. No.: 17/482,782

(22) Filed: Sep. 23, 2021

(65) Prior Publication Data

US 2022/0012487 A1    Jan. 13, 2022

Related U.S. Application Data

(63) Continuation of application No. 16/817,451, filed on Mar. 12, 2020, now Pat. No. 11,151,369, which is a
(Continued)

(51) Int. Cl.
*G06V 30/40*     (2022.01)
*G06Q 20/04*     (2012.01)
(Continued)

(52) U.S. Cl.
CPC ....... *G06V 30/1448* (2022.01); *G06Q 20/042* (2013.01); *G06V 30/2253* (2022.01);
(Continued)

(58) Field of Classification Search
CPC .............................................. G06V 30/00–43
See application file for complete search history.

(56) References Cited

U.S. PATENT DOCUMENTS

| 4,311,914 A | 1/1982 | Huber |
| 5,326,959 A | 7/1994 | Perazza |

(Continued)

FOREIGN PATENT DOCUMENTS

| CA | 2773730 A1 | 4/2012 |
| KR | 1020040076131 A | 8/2004 |

(Continued)

OTHER PUBLICATIONS

Office Action dated Jan. 12, 2023 in related U.S. Appl. No. 17/479,904, in 34 pages.

(Continued)

*Primary Examiner* — Sean T Motsinger
(74) *Attorney, Agent, or Firm* — Procopio, Cory, Hargreaves & Savitch LLP

(57) ABSTRACT

Systems and methods are provided for processing an image of a financial payment document captured using a mobile device and classifying the type of payment document in order to extract the content therein. These methods may be implemented on a mobile device or a central server, and can be used to identify content on the payment document and determine whether the payment document is ready to be processed by a business or financial institution. The system can identify the type of payment document by identifying features on the payment document and performing a series of steps to determine probabilities that the payment document belongs to a specific document type. The identification steps are arranged starting with the fastest step in order to attempt to quickly determine the payment document type without requiring lengthy, extensive analysis.

16 Claims, 10 Drawing Sheets

Related U.S. Application Data continuation of application No. 16/579,625, filed on Sep. 23, 2019, now Pat. No. 10,607,073, which is a continuation of application No. 15/077,801, filed on Mar. 22, 2016, now Pat. No. 10,423,826, which is a continuation of application No. 13/844,748, filed on Mar. 15, 2013, now Pat. No. 9,292,737, which is a continuation-in-part of application No. 12/778,943, filed on May 12, 2010, now Pat. No. 8,582,862, which is a continuation-in-part of application No. 12/717,080, filed on Mar. 3, 2010, now Pat. No. 7,778,457, which is a continuation-in-part of application No. 12/346,071, filed on Dec. 30, 2008, now Pat. No. 7,953,268, which is a continuation-in-part of application No. 12/346,091, filed on Dec. 30, 2008, now Pat. No. 7,949,176.

(60) Provisional application No. 61/022,279, filed on Jan. 18, 2008.

(51) Int. Cl.
*G06V 30/14* (2022.01)
*G06V 30/224* (2022.01)
*G06V 30/413* (2022.01)
*G06V 30/418* (2022.01)
*G06V 30/10* (2022.01)

(52) U.S. Cl.
CPC ............ *G06V 30/40* (2022.01); *G06V 30/413* (2022.01); *G06V 30/418* (2022.01); *G06V 30/10* (2022.01)

(56) References Cited

U.S. PATENT DOCUMENTS

| | | | |
|---|---|---|---|
| 5,600,732 | A | 2/1997 | Ott et al. |
| 5,751,841 | A | 5/1998 | Leong et al. |
| 5,761,686 | A | 6/1998 | Bloomberg |
| 5,920,847 | A | 7/1999 | Kolling et al. |
| 5,966,473 | A | 10/1999 | Takahashi et al. |
| 5,999,636 | A | 12/1999 | Juang |
| 6,038,351 | A | 3/2000 | Rigakos |
| 6,038,553 | A | 3/2000 | Hyde, Jr. |
| 6,070,150 | A | 5/2000 | Remington et al. |
| 6,125,362 | A * | 9/2000 | Elworthy .............. G06F 40/263 |
| 6,282,326 | B1 | 8/2001 | Lee et al. |
| 6,304,684 | B1 | 10/2001 | Niczyporuk et al. |
| 6,345,130 | B1 | 2/2002 | Dahl |
| 6,408,094 | B1 | 6/2002 | Mirzaoff et al. |
| 6,516,078 | B1 * | 2/2003 | Yang ....................... G07D 7/20 713/176 |
| 6,621,919 | B2 | 9/2003 | Mennie et al. |
| 6,735,341 | B1 | 5/2004 | Horie et al. |
| 6,807,294 | B2 | 10/2004 | Yamazaki |
| 6,947,610 | B2 | 9/2005 | Sun |
| 6,985,631 | B2 | 1/2006 | Zhang |
| 6,993,205 | B1 | 1/2006 | Lorie et al. |
| 7,020,320 | B2 | 3/2006 | Filatov |
| 7,072,862 | B1 * | 7/2006 | Wilson ................. G06Q 40/123 705/31 |
| 7,133,558 | B1 | 11/2006 | Ohara et al. |
| 7,245,765 | B2 | 7/2007 | Myers et al. |
| 7,283,656 | B2 | 10/2007 | Blake et al. |
| 7,301,564 | B2 | 11/2007 | Fan |
| 7,331,523 | B2 | 2/2008 | Meier et al. |
| 7,376,258 | B2 | 5/2008 | Klein et al. |
| 7,377,425 | B1 | 5/2008 | Ma et al. |
| 7,426,316 | B2 | 9/2008 | Vehvilinen |
| 7,433,098 | B2 | 10/2008 | Klein et al. |
| 7,478,066 | B2 | 1/2009 | Remington et al. |
| 7,548,641 | B2 | 6/2009 | Gilson et al. |
| 7,558,418 | B2 | 7/2009 | Verma et al. |
| 7,584,128 | B2 | 9/2009 | Mason et al. |
| 7,593,595 | B2 | 9/2009 | Heaney, Jr. et al. |
| 7,606,741 | B2 | 10/2009 | King et al. |
| 7,636,483 | B2 | 12/2009 | Yamaguchi et al. |
| 7,735,721 | B1 | 6/2010 | Ma et al. |
| 7,778,457 | B2 | 8/2010 | Nepomniachtchi et al. |
| 7,793,831 | B2 | 9/2010 | Beskitt |
| 7,793,835 | B1 | 9/2010 | Coggeshall et al. |
| 7,817,854 | B2 | 10/2010 | Taylor |
| 7,869,098 | B2 | 1/2011 | Corso et al. |
| 7,873,200 | B1 | 1/2011 | Oakes, III et al. |
| 7,876,949 | B1 | 1/2011 | Oakes, III et al. |
| 7,949,176 | B2 | 5/2011 | Nepomniachtchi |
| 7,950,698 | B2 | 5/2011 | Popadic et al. |
| 7,953,268 | B2 | 5/2011 | Nepomniachtchi |
| 7,982,770 | B1 | 5/2011 | Kahn et al. |
| 7,974,899 | B1 | 7/2011 | Prasad et al. |
| 7,978,900 | B2 | 7/2011 | Nepomniachtchi et al. |
| 7,983,468 | B2 | 7/2011 | Ibikunle et al. |
| 7,986,346 | B2 | 7/2011 | Kaneda et al. |
| 7,995,196 | B1 | 8/2011 | Fraser |
| 7,996,317 | B1 | 8/2011 | Gurz |
| 8,000,514 | B2 | 8/2011 | Nepomniachtchi et al. |
| 8,023,155 | B2 | 9/2011 | Jiang |
| 8,025,226 | B1 | 9/2011 | Hopkins, III et al. |
| 8,109,436 | B1 | 2/2012 | Hopkins, III |
| 8,118,216 | B2 | 2/2012 | Hoch et al. |
| 8,121,948 | B2 | 2/2012 | Gustin et al. |
| 8,126,252 | B2 | 2/2012 | Abernethy et al. |
| 8,160,149 | B2 | 4/2012 | Demos |
| 8,180,137 | B2 | 5/2012 | Faulkner et al. |
| 8,233,714 | B2 | 7/2012 | Zuev et al. |
| 8,238,638 | B2 | 8/2012 | Mueller et al. |
| 8,290,237 | B1 | 10/2012 | Burks et al. |
| 8,300,917 | B2 | 10/2012 | Borgia et al. |
| 8,320,657 | B1 | 11/2012 | Burks et al. |
| 8,326,015 | B2 | 12/2012 | Nepomniachtchi |
| 8,339,642 | B2 | 12/2012 | Ono |
| 8,340,452 | B2 | 12/2012 | Marchesotti |
| 8,358,826 | B1 | 1/2013 | Medina, III et al. |
| 8,370,254 | B1 | 2/2013 | Hopkins, III et al. |
| 8,374,383 | B2 | 2/2013 | Long et al. |
| 8,379,914 | B2 | 2/2013 | Nepomniachtchi et al. |
| 8,442,844 | B1 | 5/2013 | Trandal et al. |
| 8,532,419 | B2 | 9/2013 | Coleman |
| 8,538,124 | B1 | 9/2013 | Harpel et al. |
| 8,540,158 | B2 | 9/2013 | Lei et al. |
| 8,542,921 | B1 | 9/2013 | Medina |
| 8,559,766 | B2 | 10/2013 | Tilt et al. |
| 8,582,862 | B2 | 11/2013 | Nepomniachtchi et al. |
| 8,688,579 | B1 | 4/2014 | Ethington et al. |
| 8,699,779 | B1 | 4/2014 | Prasad et al. |
| 8,837,833 | B1 | 9/2014 | Wang et al. |
| 8,861,883 | B2 | 10/2014 | Tanaka |
| 8,879,783 | B1 | 11/2014 | Wang et al. |
| 8,959,033 | B1 | 2/2015 | Oakes, III et al. |
| 8,977,571 | B1 | 3/2015 | Bueche, Jr. et al. |
| 9,058,512 | B1 | 6/2015 | Medina, III |
| 9,208,393 | B2 | 12/2015 | Kotovich et al. |
| 9,460,141 | B1 | 10/2016 | Coman |
| 9,613,258 | B2 | 4/2017 | Chen et al. |
| 9,679,214 | B2 | 6/2017 | Kotovich et al. |
| 9,710,702 | B2 | 7/2017 | Nepomniachtchi et al. |
| 9,773,186 | B2 | 9/2017 | Nepomniachtchi et al. |
| 9,786,011 | B1 | 10/2017 | Engelhorn et al. |
| 9,842,331 | B2 | 12/2017 | Nepomniachtchi et al. |
| 10,095,947 | B2 | 10/2018 | Nepomniachtchi et al. |
| 10,102,583 | B2 | 10/2018 | Strange |
| 10,275,673 | B2 | 4/2019 | Kotovich et al. |
| 10,360,447 | B2 | 7/2019 | Nepomniachtchi et al. |
| 10,373,136 | B1 | 8/2019 | Pollack et al. |
| 10,452,908 | B1 | 10/2019 | Ramanathan et al. |
| 10,546,206 | B2 | 1/2020 | Nepomniachtchi et al. |
| 10,621,660 | B1 | 4/2020 | Medina et al. |
| 10,789,496 | B2 | 9/2020 | Kotovich et al. |
| 10,789,501 | B2 | 9/2020 | Nepomniachtchi et al. |
| 10,891,475 | B2 | 1/2021 | Nepomniachtchi et al. |
| 10,909,362 | B2 | 2/2021 | Nepomniachtchi et al. |
| 11,157,731 | B2 | 10/2021 | Nepomniachtchi et al. |

(56) References Cited

U.S. PATENT DOCUMENTS

| | | |
|---|---|---|
| 11,380,113 B2 | 7/2022 | Nepomniachtchi et al. |
| 11,393,272 B2 | 7/2022 | Kriegsfeld et al. |
| 2001/0014183 A1 | 8/2001 | Sansom-Wai et al. |
| 2001/0016084 A1 | 8/2001 | Pollard et al. |
| 2001/0019334 A1 | 9/2001 | Carrai et al. |
| 2001/0019664 A1 | 9/2001 | Pilu |
| 2001/0044899 A1 | 11/2001 | Levy |
| 2002/0003896 A1 | 1/2002 | Yamazaki |
| 2002/0012462 A1 | 1/2002 | Fujiwara |
| 2002/0023055 A1 | 2/2002 | Antognini et al. |
| 2002/0037097 A1* | 3/2002 | Hoyos .............. G07F 19/20 382/137 |
| 2002/0041717 A1 | 4/2002 | Murata et al. |
| 2002/0044689 A1 | 4/2002 | Roustaei et al. |
| 2002/0046341 A1 | 4/2002 | Kazaks et al. |
| 2002/0067846 A1 | 6/2002 | Foley |
| 2002/0073044 A1 | 6/2002 | Singhal |
| 2002/0077976 A1 | 6/2002 | Meyer et al. |
| 2002/0080013 A1 | 6/2002 | Lii et al. |
| 2002/0085745 A1* | 7/2002 | Jones .............. G07D 7/12 382/135 |
| 2002/0120846 A1 | 8/2002 | Stewart et al. |
| 2002/0128967 A1 | 9/2002 | Meyer et al. |
| 2002/0138351 A1 | 9/2002 | Houvener et al. |
| 2002/0143804 A1 | 10/2002 | Dowdy |
| 2002/0150279 A1 | 10/2002 | Scott et al. |
| 2003/0009420 A1 | 1/2003 | Jones |
| 2003/0072568 A1 | 4/2003 | Lin et al. |
| 2003/0086615 A1 | 5/2003 | Dance et al. |
| 2003/0099379 A1* | 5/2003 | Monk .............. G06V 30/40 382/218 |
| 2003/0099401 A1* | 5/2003 | Driggs .............. G06F 18/254 704/E15.049 |
| 2003/0156201 A1 | 8/2003 | Zhang |
| 2003/0161523 A1 | 8/2003 | Moon et al. |
| 2003/0177100 A1 | 9/2003 | Filatov |
| 2004/0012679 A1 | 1/2004 | Fan |
| 2004/0017947 A1 | 1/2004 | Yang |
| 2004/0024769 A1* | 2/2004 | Forman .............. G06F 16/353 |
| 2004/0037448 A1 | 2/2004 | Brundage |
| 2004/0081332 A1* | 4/2004 | Tuttle .............. G06V 30/40 382/100 |
| 2004/0109597 A1 | 6/2004 | Lugg |
| 2004/0205474 A1 | 10/2004 | Eskin et al. |
| 2004/0213434 A1 | 10/2004 | Emerson et al. |
| 2004/0213437 A1 | 10/2004 | Howard et al. |
| 2004/0218799 A1 | 11/2004 | Mastie et al. |
| 2004/0236688 A1* | 11/2004 | Bozeman .............. G06Q 20/26 705/42 |
| 2004/0236690 A1* | 11/2004 | Bogosian .............. G06Q 20/10 705/42 |
| 2004/0247168 A1* | 12/2004 | Pintsov .............. G06V 30/1444 382/209 |
| 2005/0011957 A1 | 1/2005 | Attia et al. |
| 2005/0065893 A1 | 3/2005 | Josephson |
| 2005/0071283 A1 | 3/2005 | Randle et al. |
| 2005/0080698 A1 | 4/2005 | Perg et al. |
| 2005/0091161 A1 | 4/2005 | Gustin et al. |
| 2005/0097046 A1 | 5/2005 | Singfield |
| 2005/0100216 A1 | 5/2005 | Myers et al. |
| 2005/0125295 A1* | 6/2005 | Tidwell .............. G06Q 20/4014 705/16 |
| 2005/0129300 A1* | 6/2005 | Sandison .............. G06V 30/2253 382/137 |
| 2005/0141028 A1 | 6/2005 | Koppich |
| 2005/0143136 A1 | 6/2005 | Lev et al. |
| 2005/0163362 A1* | 7/2005 | Jones .............. G07F 19/202 382/137 |
| 2005/0180661 A1 | 8/2005 | El Bernoussi et al. |
| 2005/0192897 A1 | 9/2005 | Rogers et al. |
| 2005/0196069 A1 | 9/2005 | Yonaha |
| 2005/0196071 A1 | 9/2005 | Prakash et al. |
| 2005/0213805 A1 | 9/2005 | Blake et al. |
| 2005/0219367 A1 | 10/2005 | Kanda et al. |
| 2005/0220324 A1 | 10/2005 | Klein et al. |
| 2005/0229010 A1* | 10/2005 | Monk .............. G06V 30/40 713/186 |
| 2005/0242186 A1 | 11/2005 | Ohbuchi |
| 2005/0261990 A1 | 11/2005 | Gocht et al. |
| 2006/0008167 A1 | 1/2006 | Yu et al. |
| 2006/0008267 A1 | 1/2006 | Kim |
| 2006/0012699 A1 | 1/2006 | Miki |
| 2006/0039629 A1 | 2/2006 | Li et al. |
| 2006/0045322 A1 | 3/2006 | Clarke et al. |
| 2006/0045342 A1 | 3/2006 | Kim et al. |
| 2006/0045344 A1 | 3/2006 | Paxton et al. |
| 2006/0045379 A1 | 3/2006 | Heaney et al. |
| 2006/0071950 A1 | 4/2006 | Kurzweil et al. |
| 2006/0072822 A1 | 4/2006 | Hatzav et al. |
| 2006/0088214 A1 | 4/2006 | Handley et al. |
| 2006/0106717 A1 | 5/2006 | Randle et al. |
| 2006/0140504 A1 | 6/2006 | Fujimoto et al. |
| 2006/0164682 A1 | 7/2006 | Lev |
| 2006/0177118 A1 | 8/2006 | Ibikunle et al. |
| 2006/0182331 A1 | 8/2006 | Gilson et al. |
| 2006/0186194 A1 | 8/2006 | Richardson et al. |
| 2006/0210192 A1 | 9/2006 | Orhun |
| 2006/0221415 A1 | 10/2006 | Kawamoto |
| 2006/0242063 A1 | 10/2006 | Peterson et al. |
| 2006/0280354 A1 | 12/2006 | Murray |
| 2006/0291727 A1 | 12/2006 | Bargeron |
| 2007/0009155 A1 | 1/2007 | Potts et al. |
| 2007/0053574 A1 | 3/2007 | Verma et al. |
| 2007/0058851 A1 | 3/2007 | Quine et al. |
| 2007/0064991 A1 | 3/2007 | Douglas et al. |
| 2007/0071324 A1 | 3/2007 | Thakur |
| 2007/0076940 A1 | 4/2007 | Goodall et al. |
| 2007/0081796 A1 | 4/2007 | Fredlund et al. |
| 2007/0084911 A1 | 4/2007 | Crowell |
| 2007/0086642 A1 | 4/2007 | Foth et al. |
| 2007/0086643 A1 | 4/2007 | Spier et al. |
| 2007/0110277 A1* | 5/2007 | Hayduchok ........ G06V 30/2253 382/101 |
| 2007/0114785 A1* | 5/2007 | Porter .............. B42D 25/29 283/58 |
| 2007/0118391 A1 | 5/2007 | Malaney et al. |
| 2007/0131759 A1 | 6/2007 | Cox et al. |
| 2007/0140678 A1 | 6/2007 | Yost et al. |
| 2007/0154071 A1 | 7/2007 | Lin et al. |
| 2007/0156438 A1 | 7/2007 | Popadic et al. |
| 2007/0168382 A1 | 7/2007 | Tillberg et al. |
| 2007/0171288 A1 | 7/2007 | Inoue et al. |
| 2007/0174214 A1 | 7/2007 | Welsh et al. |
| 2007/0195174 A1 | 8/2007 | Oren |
| 2007/0206877 A1 | 9/2007 | Wu et al. |
| 2007/0211964 A1 | 9/2007 | Agam et al. |
| 2007/0214078 A1 | 9/2007 | Coppinger |
| 2007/0244782 A1 | 10/2007 | Chimento |
| 2007/0265887 A1 | 11/2007 | Mclaughlin et al. |
| 2007/0288382 A1 | 12/2007 | Narayanan et al. |
| 2007/0297664 A1 | 12/2007 | Blaikie |
| 2008/0010621 A1 | 1/2008 | Rackley, III et al. |
| 2008/0031543 A1 | 2/2008 | Nakajima et al. |
| 2008/0040259 A1 | 2/2008 | Snow et al. |
| 2008/0040280 A1* | 2/2008 | Davis .............. G06Q 20/108 705/45 |
| 2008/0062437 A1 | 3/2008 | Rizzo |
| 2008/0086420 A1* | 4/2008 | Gilder .............. G06Q 20/04 705/35 |
| 2008/0089573 A1 | 4/2008 | Mori et al. |
| 2008/0128505 A1 | 6/2008 | Challa et al. |
| 2008/0152238 A1* | 6/2008 | Sarkar .............. G06V 30/40 382/228 |
| 2008/0174815 A1 | 7/2008 | Komaki |
| 2008/0183576 A1 | 7/2008 | Kim et al. |
| 2008/0192129 A1 | 8/2008 | Walker et al. |
| 2008/0193020 A1 | 8/2008 | Sibiryakov et al. |
| 2008/0212901 A1 | 9/2008 | Castiglia et al. |
| 2008/0231714 A1 | 9/2008 | Estevez et al. |
| 2008/0235263 A1 | 9/2008 | Riaz et al. |
| 2008/0247629 A1 | 10/2008 | Gilder et al. |
| 2008/0249931 A1 | 10/2008 | Gilder et al. |
| 2008/0249936 A1 | 10/2008 | Miller et al. |

(56) References Cited

U.S. PATENT DOCUMENTS

| | | |
|---|---|---|
| 2008/0267510 A1 | 10/2008 | Paul et al. |
| 2008/0306787 A1 | 12/2008 | Hamilton et al. |
| 2009/0041377 A1 | 2/2009 | Edgar |
| 2009/0063431 A1 | 3/2009 | Erol |
| 2009/0092322 A1 | 4/2009 | Erol et al. |
| 2009/0108080 A1 | 4/2009 | Meyer et al. |
| 2009/0114716 A1 | 5/2009 | Ramachandran |
| 2009/0125510 A1 | 5/2009 | Graham et al. |
| 2009/0141962 A1 | 6/2009 | Borgia et al. |
| 2009/0159659 A1 | 6/2009 | Norris et al. |
| 2009/0185241 A1 | 7/2009 | Nepomniachtchi |
| 2009/0185736 A1 | 7/2009 | Nepomniachtchi |
| 2009/0185737 A1 | 7/2009 | Nepomniachtchi |
| 2009/0185738 A1 | 7/2009 | Nepomniachtchi |
| 2009/0185752 A1 | 7/2009 | Dwivedula et al. |
| 2009/0190830 A1 | 7/2009 | Hasegawa |
| 2009/0196485 A1 | 8/2009 | Mueller et al. |
| 2009/0198493 A1 | 8/2009 | Hakkani-Tur et al. |
| 2009/0201541 A1 | 8/2009 | Neogi et al. |
| 2009/0216672 A1 | 8/2009 | Zulf |
| 2009/0261158 A1 | 10/2009 | Lawson |
| 2009/0265134 A1 | 10/2009 | Sambasivan et al. |
| 2009/0271287 A1 | 10/2009 | Halpern |
| 2009/0285444 A1 | 11/2009 | Erol et al. |
| 2010/0030524 A1 | 2/2010 | Warren |
| 2010/0037059 A1 | 2/2010 | Sun et al. |
| 2010/0038839 A1* | 2/2010 | DeWitt .......... G06V 30/40 271/264 |
| 2010/0073735 A1 | 3/2010 | Hunt et al. |
| 2010/0074547 A1 | 3/2010 | Yu et al. |
| 2010/0080471 A1 | 4/2010 | Haas et al. |
| 2010/0082470 A1 | 4/2010 | Walach et al. |
| 2010/0102119 A1 | 4/2010 | Gustin et al. |
| 2010/0104171 A1 | 4/2010 | Faulkner et al. |
| 2010/0114765 A1 | 5/2010 | Gustin et al. |
| 2010/0114766 A1 | 5/2010 | Gustin et al. |
| 2010/0114771 A1 | 5/2010 | Gustin et al. |
| 2010/0114772 A1 | 5/2010 | Gustin et al. |
| 2010/0150424 A1 | 6/2010 | Nepomniachtchi et al. |
| 2010/0161466 A1 | 6/2010 | Gilder |
| 2010/0200660 A1 | 8/2010 | Moed et al. |
| 2010/0208282 A1 | 8/2010 | Isaev |
| 2010/0239160 A1 | 9/2010 | Enomoto et al. |
| 2010/0246972 A1 | 9/2010 | Koyama et al. |
| 2010/0253787 A1 | 10/2010 | Grant |
| 2010/0254604 A1* | 10/2010 | Prabhakara .......... G06V 30/416 382/173 |
| 2010/0284611 A1 | 11/2010 | Lee et al. |
| 2011/0013822 A1 | 1/2011 | Blackson et al. |
| 2011/0026810 A1* | 2/2011 | Hu ............... G06F 18/2148 382/190 |
| 2011/0052065 A1 | 3/2011 | Nepomniachtchi et al. |
| 2011/0075936 A1 | 3/2011 | Deaver |
| 2011/0081051 A1 | 4/2011 | Tayal et al. |
| 2011/0091092 A1* | 4/2011 | Nepomniachtchi .. G06Q 20/042 382/137 |
| 2011/0134248 A1 | 6/2011 | Heit et al. |
| 2011/0170740 A1 | 7/2011 | Coleman |
| 2011/0188759 A1* | 8/2011 | Filimonova ............ G06F 16/93 382/195 |
| 2011/0194750 A1 | 8/2011 | Nepomniachtchi |
| 2011/0249905 A1 | 10/2011 | Singh et al. |
| 2011/0255795 A1 | 10/2011 | Nakamura |
| 2011/0280450 A1 | 11/2011 | Nepomniachtchi et al. |
| 2011/0289028 A1 | 11/2011 | Sato |
| 2012/0010885 A1 | 1/2012 | Hakkani-Tr et al. |
| 2012/0023567 A1 | 1/2012 | Hammad |
| 2012/0030104 A1 | 2/2012 | Huff et al. |
| 2012/0033892 A1 | 2/2012 | Blenkhorn et al. |
| 2012/0051649 A1* | 3/2012 | Saund ............... G06V 30/1444 382/294 |
| 2012/0070062 A1 | 3/2012 | Houle et al. |
| 2012/0072859 A1* | 3/2012 | Wang .................... G06V 30/40 715/764 |
| 2012/0086989 A1 | 4/2012 | Collins et al. |
| 2012/0106802 A1 | 5/2012 | Hsieh et al. |
| 2012/0109792 A1 | 5/2012 | Eftekhari et al. |
| 2012/0113489 A1* | 5/2012 | Heit .................. G06V 30/1423 382/140 |
| 2012/0150773 A1 | 6/2012 | Dicorpo et al. |
| 2012/0197640 A1 | 8/2012 | Hakkani-Tr et al. |
| 2012/0201416 A1* | 8/2012 | DeWitt ................ G06V 30/40 382/101 |
| 2012/0226600 A1* | 9/2012 | Dolev .............. G06V 10/7515 382/137 |
| 2012/0230577 A1* | 9/2012 | Calman ............. G06Q 20/0425 382/138 |
| 2012/0265655 A1 | 10/2012 | Stroh |
| 2012/0278336 A1 | 11/2012 | Malik et al. |
| 2012/0308139 A1 | 12/2012 | Dhir |
| 2013/0004076 A1 | 1/2013 | Koo et al. |
| 2013/0022231 A1 | 1/2013 | Nepomniachtchi et al. |
| 2013/0051610 A1 | 2/2013 | Roach et al. |
| 2013/0058531 A1 | 3/2013 | Hedley et al. |
| 2013/0085935 A1 | 4/2013 | Nepomniachtchi et al. |
| 2013/0120595 A1 | 5/2013 | Roach et al. |
| 2013/0148862 A1 | 6/2013 | Roach et al. |
| 2013/0155474 A1 | 6/2013 | Roach et al. |
| 2013/0181054 A1 | 7/2013 | Durham et al. |
| 2013/0182002 A1 | 7/2013 | Macciola et al. |
| 2013/0182951 A1 | 7/2013 | Shustorovich et al. |
| 2013/0182973 A1 | 7/2013 | Macciola et al. |
| 2013/0202185 A1 | 8/2013 | Irwin, Jr. et al. |
| 2013/0204777 A1 | 8/2013 | Irwin, Jr. et al. |
| 2013/0223721 A1 | 8/2013 | Nepomniachtchi et al. |
| 2013/0272607 A1 | 10/2013 | Chattopadhyay et al. |
| 2013/0297353 A1 | 11/2013 | Strange et al. |
| 2013/0311362 A1 | 11/2013 | Milam et al. |
| 2013/0317865 A1 | 11/2013 | Tofte et al. |
| 2013/0325706 A1 | 12/2013 | Wilson et al. |
| 2014/0032406 A1 | 1/2014 | Roach et al. |
| 2014/0037183 A1* | 2/2014 | Gorski ................ G06Q 40/02 382/137 |
| 2014/0040141 A1 | 2/2014 | Gauvin et al. |
| 2014/0044303 A1 | 2/2014 | Chakraborti |
| 2014/0046841 A1 | 2/2014 | Gauvin et al. |
| 2014/0064621 A1* | 3/2014 | Reese ................ G06V 30/413 382/190 |
| 2014/0108456 A1* | 4/2014 | Ramachandrula ... G06V 30/412 707/779 |
| 2014/0126790 A1 | 5/2014 | Duchesne et al. |
| 2014/0133767 A1 | 5/2014 | Lund et al. |
| 2014/0172467 A1 | 6/2014 | He et al. |
| 2014/0188715 A1 | 7/2014 | Barlok et al. |
| 2014/0233837 A1 | 8/2014 | Sandoz et al. |
| 2014/0254887 A1 | 9/2014 | Amtrup et al. |
| 2014/0258838 A1 | 9/2014 | Evers et al. |
| 2014/0270540 A1 | 9/2014 | Spector et al. |
| 2014/0281871 A1 | 9/2014 | Brunner et al. |
| 2014/0307959 A1* | 10/2014 | Filimonova .......... G06V 30/416 382/190 |
| 2015/0012382 A1 | 1/2015 | Ceribelli et al. |
| 2015/0012442 A1 | 1/2015 | Ceribelli et al. |
| 2015/0040001 A1 | 2/2015 | Kannan et al. |
| 2015/0142545 A1 | 5/2015 | Ceribelli et al. |
| 2015/0142643 A1 | 5/2015 | Ceribelli et al. |
| 2015/0334184 A1 | 11/2015 | Liverance |
| 2016/0092730 A1* | 3/2016 | Smirnov ............. G06V 30/414 382/195 |
| 2017/0185972 A1 | 6/2017 | Bozeman |
| 2017/0316263 A1 | 11/2017 | Nepomniachtchi et al. |
| 2018/0101751 A1 | 4/2018 | Ghosh et al. |
| 2018/0101836 A1 | 4/2018 | Nepomniachtchi et al. |
| 2018/0240081 A1 | 8/2018 | Doyle et al. |
| 2020/0304650 A1 | 9/2020 | Roach et al. |
| 2020/0342248 A1 | 10/2020 | Nepomniachtchi et al. |

(56) References Cited

U.S. PATENT DOCUMENTS

| | | | |
|---|---|---|---|
| 2021/0090372 A1 | 3/2021 | Kriegsfeld et al. | |
| 2022/0351161 A1 | 11/2022 | Roach et al. | |

FOREIGN PATENT DOCUMENTS

| | | | |
|---|---|---|---|
| KR | 1020070115834 A | 12/2007 | |
| WO | 03069425 A2 | 8/2003 | |
| WO | 2006075967 A1 | 7/2006 | |
| WO | 2006136958 A2 | 12/2006 | |
| WO | 2012144957 A1 | 10/2012 | |

OTHER PUBLICATIONS

Pdf417, Wikipedia: the free encyclopedia, Oct. 21, 2008, https://en.wikipedia.org/w/index.php?title=PDF417&oldid=246681430 (Year: 2008), 3 pages.

Abdulkader et al. "Low Cost Correction of OCR Errors Using Learning in a Multi-Engine Environment." Proceedings of the 10th International Conference on Document Analysis and Recognition (ICDAR '09). IEEE Computer Society, Washington, D.C., USA. pp. 576-580. http://dx.doi.org/10.1109/ICDAR.2009.24.

Bassil, Youssef. "OCR Post-Processing Error Correction Algorithm Using Google's Online Spelling Suggestion." Journal of Emergin Trends in Computing and Information Sciences 3, No. 1 (Jan. 2012): 1. Accessed May 13, 2015. http://arxiv.org/ftp/arxiv/papers/1204/1204.0191.pdf.

Bieniecki et al. "Image preprocessing for improving OCR accuracy." Perspective Technologies and Methods in MEMS Design, 2007. International Conference on MEMSTECH 2007. IEEE, 2007.

Chattopadhyay et al. "On the Enhancement and Binarization of Mobile Captured Vehicle Identification Number for an Embedded Solution." 10th IAPR International Workshop on Document Analysis Systems (DAS), 2012. pp. 235-239. Mar. 27-29, 2012.

Cook, John. "Three Algorithms for Converting Color to Grayscale." Singular Value Consulting. Aug. 24, 2009. Accessed May 13, 2015. http://www.johndcook.com/blog/2009/08/24/algorithms-convert-color-grayscale/.

Gatos et al. "Improved Document Image Binarization by Using a Combination of Multiple Binarization Techniques and Adapted Edge Information." 19th International Conference on Pattern Recognition, 2008. IEEE.

He et al, "Corner deterctor Based on Global and Local Curvature Properties" Optical Engineering 47(5), 0570008 (2008).

International Search Report and Written Opinion received in PCT/US2011/056593, mailed May 30, 2012, 9 pages.

International Search Report issued in related International Application No. PCT/US2011/056593 dated May 30, 2012 (3 pages).

Notice of Allowance dated Feb. 22, 2023 received in U.S. Appl. No. 17/236,373 in 30 pages.

Notice of Allowance for related U.S. Appl. No. 16/160,796, mailed on Jan. 22, 2021, in 17 pages.

Notice of Allowance for related U.S. Appl. No. 16/579,625, mailed on Jan. 13, 2020 in 27 pages.

Notice of Allowance for related U.S. Appl. No. 16/742,439, mailed on Sep. 18, 2020, in 39 pages.

Notice of Allowance for related U.S. Appl. No. 17/829,025, mailed on Apr. 11, 2023, in 13 pages.

OCR: The Most Important Scanning Feature You Never Knew You Needed. hp (blog), Feb. 24, 2012. Accessed May 13, 2015. http://h71036.www7.hp.com/hho/cache/608037-0-0-39-121.html., 4 pages.

Office Action dated Feb. 1, 2023 in related U.S. Appl. No. 16/987,782, in 104 pages.

Office Action dated Jan. 9, 2020 for related U.S. Appl. No. 16/397,728 in 56 pages.

Office Action dated Jul. 11, 2019 for related U.S. Appl. No. 15/614,456 in 45 pages.

Office Action dated Jul. 26, 2019 for related U.S. Appl. No. 16/282,250 in 21 pages.

Office Action dated Mar. 20, 2020 in related U.S. Appl. No. 16/282,250, in 20 pages.

Office Action dated May 27, 2020 for related U.S. Appl. No. 16/282,250 in 18 pages.

Office Action dated Sep. 25, 2019 for related U.S. Appl. No. 16/518,815, in 10 pages.

Office Action for related CA Patent Application No. 2,773,730, dated Aug. 21, 2017, in 4 pages.

Office Action for related U.S. Appl. No. 16/259,896, mailed on Dec. 12, 2019, in 22 pages.

Office Action for related U.S. Appl. No. 17/983,785, mailed on Jun. 23, 2023, in 48 pages.

Office Action for related U.S. Appl. No. 17/983,785, mailed on Mar. 30, 2023, in 46 pages.

Relativity. "Searching Manual." Aug. 27, 2010. Accessed May 13, 2015. http://www.inventus.com/wp-content/uploads/2010/09/Relativity-Searching-Manual-6.6.pdf, 67 pages.

Shah et al. "OCR-Based chassis-number recognition using artificial neural networks." 2009 IEEE Conference on Vehicular Electronics and Safety. pp. 31-34. Nov. 11-12, 2009.

Stevens. "Advanced Programming in the UNIX Environment." Addison-Wesley Publishing Company, pp. 195-196 (1992).

"Tokenworks Introduces IDWedge ID Scanner Solution." 2008, 5 pages.

Junker et al. "Evaluating OCR and Non-OCR Text Representation for Learning Document Classifiers." Proceedings of the 4th International Conference on Document Analysis and Recognition. Ulm, Germany. Aug. 18-20, 1997. p. 1060-1066 (1997). Accessed http://citeseerxist.psu.eduviewdoc/download?doi=10.1.1.6.6732&rep=rep1-&type=pdf.

\* cited by examiner

SYSTEMS AND METHODS FOR CLASSIFYING PAYMENT DOCUMENTS DURING MOBILE IMAGE PROCESSING

CROSS-REFERENCE TO RELATED APPLICATIONS

This application is a continuation of U.S. application Ser. No. 16/817,451, filed on Mar. 12, 2020, which is a continuation of U.S. application Ser. No. 16/579,625, filed on Sep. 23, 2019, which is a continuation of U.S. application Ser. No. 15/077,801, filed on Mar. 22, 2016, which is a continuation of U.S. application Ser. No. 13/844,748, filed on Mar. 15, 2013, which is a continuation-in-part of U.S. patent application Ser. No. 12/778,943, filed on May 12, 2010, which is a continuation-in-part of U.S. patent application Ser. No. 12/717,080, filed on Mar. 3, 2010, which is a continuation-in-part of U.S. patent application Ser. No. 12/346,071, filed on Dec. 30, 2008, which is a continuation-in-part of U.S. patent application Ser. No. 12/346,091, filed on Dec. 30, 2008, which all claim priority to U.S. Provisional Application No. 61/022,279, filed on Jan. 18, 2008, which are all hereby incorporated herein by reference in their entireties.

BACKGROUND

1. Technical Field

The embodiments described herein relate to processing images of documents captured using a mobile device, and more particularly to real-time processing and feature extraction of images of payment documents for classifying the payment document therein.

2. Related Art

Financial institutions and other businesses have become increasingly interested in electronic processing of checks and other financial documents in order to expedite processing of these documents. Some techniques allow users to scan a copy of the document using a scanner or copier to create an electronic copy of the document that can be digitally processed to extract content. This provides added convenience over the use of a hardcopy original, which would otherwise need to be physically sent or presented to the recipient for processing. For example, some banks can process digital images of checks and extract check information from the image needed to process the check for payment and deposit without requiring that the physical check be routed throughout the bank for processing. However, the type of information and the accuracy of information which can be processed from an image of a check are limited. As a result, some checks cannot be processed and are rejected during the mobile deposit process. Furthermore, the types of documents which can be processed are often limited to checks, as other financial documents have varying formats and sizes which are too difficult to process electronically.

Mobile devices that incorporate cameras have also become ubiquitous and may also be useful to capture images of financial documents for mobile processing of financial information. The mobile device may be connected with a financial institution or business through a mobile network connection. However, the process of capturing and uploading images of financial documents is often prone to error and produces images of poor quality which cannot be used to extract data. The user is often unaware of whether the captured document image is sufficient and ready for processing by a business or financial institution. Additionally, the variety of formats, sizes and content found on different types of financial documents makes capturing a quality image and accurately extracting content a difficult process.

Therefore, there is a need for identifying a document type from a digital image of a document captured by a mobile device and accurately extracting content from the document.

SUMMARY

Systems and methods are provided for processing an image of a financial payment document captured using a mobile device and classifying the type of document in order to extract the content therein. These methods may be implemented on a mobile device or a central server, and can be used to identify content on the payment document and determine whether the payment document is ready to be processed by a business or financial institution. The system can identify the type of payment document by identifying features on the payment document and performing a series of steps to determine probabilities that the payment document belongs to a specific document type. The identification steps are arranged starting with the fastest step in order to attempt to quickly determine the payment document type without requiring lengthy, extensive analysis.

The payment document may be classified as a check, it may be classified as a personal check, business check, traveler's check, cashier's check, rebate check, etc, based on features identified on the image and compared using databases which store payment type information. Once the type of payment document is determined, known information about the type of payment document is utilized to determine whether the content on the payment document is sufficient for processing of the payment (such as depositing the check) or whether any risk or indications of fraud associated with a particular type of payment document require further processing. Customized rules can be created by a business or financial institution to provide specific actions depending on the type of payment document which is being deposited. Additional portions of the payment document, including a signature line, addressee field, etc. can be checked to ensure that the check is ready to be deposited by the bank.

These and other features, aspects, and embodiments are described below in the section entitled "Detailed Description."

BRIEF DESCRIPTION OF THE DRAWINGS

Features, aspects, and embodiments are described in conjunction with the attached drawings, in which.

DETAILED DESCRIPTION

Figure 1:
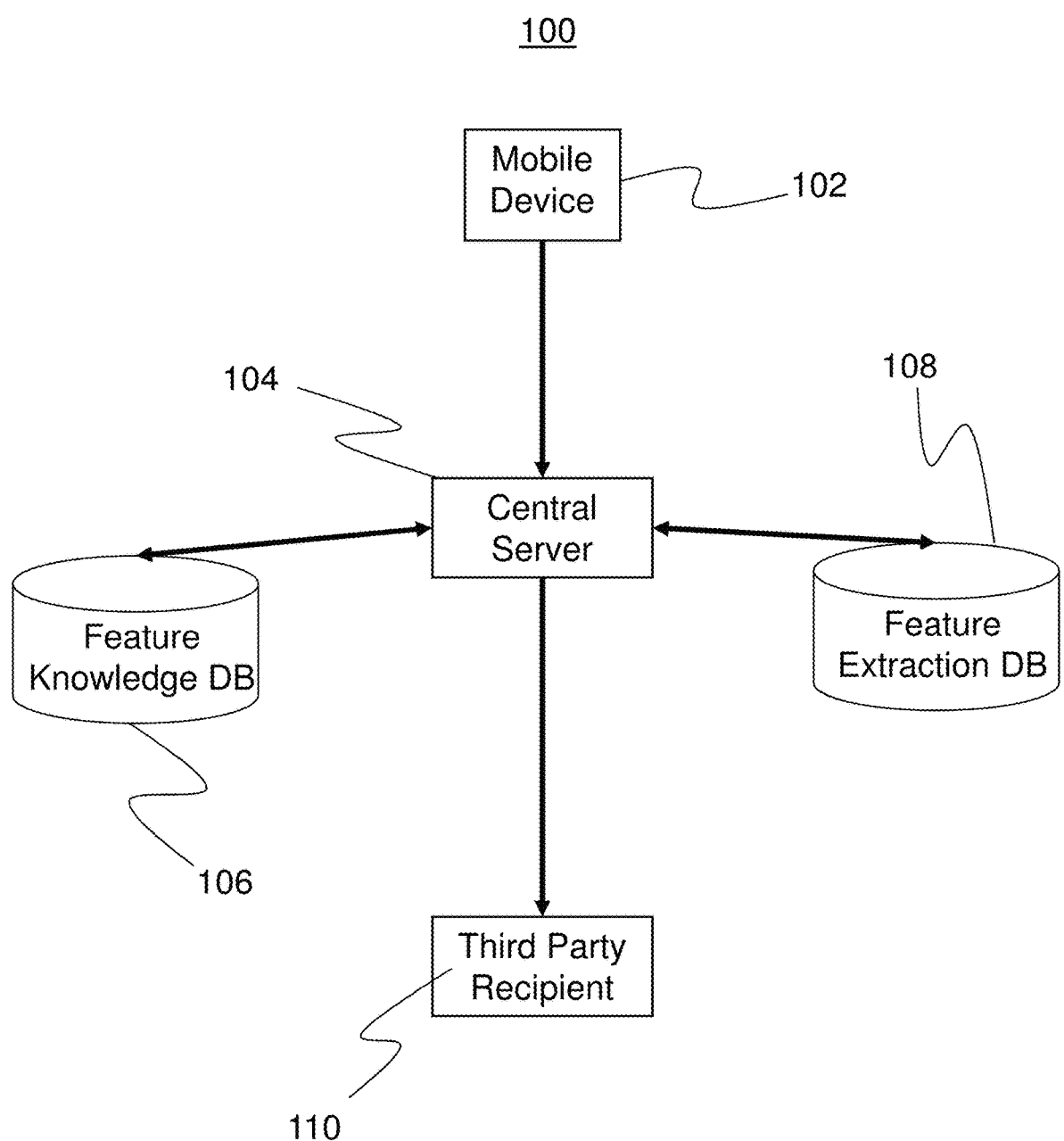
FIG. 1 is a block diagram of a system for classifying a payment document, according to one exemplary embodiment.

The following detailed description is directed to certain specific embodiments. However, it will be understood that these embodiments are by way of example only and should not be seen as limiting the systems and methods described herein to the specific embodiments, architectures, etc. In this description, reference is made to the drawings wherein like parts are designated with like numerals throughout.

Systems and methods are provided for processing an image of a financial payment document captured using a mobile device and classifying the type of payment document in order to extract the content therein. By correcting aspects of the image and extracting relevant features, the type of payment document can be identified, which then provides for faster and more accurate content extraction. An image of a payment document captured by a mobile device is first processed to improve the quality of the image and increase the ability to extract content from the image. Various features are then extracted from the image, and these features are analyzed using a probabilistic approach with a hierarchical classification algorithm to quickly and accurately classify the payment document in the fewest number of steps. Existing information about types of payment documents is utilized to determine if the features and characteristics indicate a particular payment document classification. Additionally, geometric characteristics of the payment document or keyword identification based on an optical character recognition (OCR) step may be used to classify the payment document.

In one embodiment, the payment document is a type of check, wherein the check is classified as a personal check, business check, traveler's check, cashier's check, rebate check, money order, gift certificate, IRS refund check. By classifying the type of check, stored information about particular check types can be used to more accurately capture the content of the check and verify the accuracy of the information on the check. The identified check type may also tell a third party recipient of the check, such as a bank or business, whether the payment document is authentic or fraudulent and whether further processing of the payment document is needed before it can be accepted for payment. Types of checks may be more generally sorted into categories that may be customized by the recipient, such as a group of "regular" check types which are known to be authentic or a group of "irregular checks" that are known to be fraudulent or which are difficult to process to accurately extract their content. In one embodiment, the system may determine that the payment document is simply not a check at all if the features, geometric characteristics and keywords do not provide any indications that the document is a payment document.

These systems and methods may be implemented on a mobile device or at a central server, and either can access stored information about different payment documents and their formats from databases connected with the mobile device or central service over a network. Users are also able to customize the functionality of the classification algorithm to determine the thresholds for various feature matching steps, but also to set customized classifiers which may group certain sets of payment documents into one group and the rest in another based on the user's preferences or experiences in handling checks.

Once the payment document has been classified, content can be extracted based on customized payment document information about where certain fields are located on the form and the expected values of some of those fields. The content of the payment document is more quickly and accurately captured, allowing third parties who need to process the payment document—such as a bank receiving the check for a mobile deposit process—to have greater confidence in the ability to extract the correct information.

I. System Overview

FIG. 1 illustrates one embodiment of a system 100 for processing an image of a payment document captured by a mobile device and classifying the payment document. The system 100 includes a mobile device 102, such as a cellular phone, smartphone, tablet, personal digital assistant (PDA) or other portable electronic device that may be connected with a communications network. The mobile device 102 may include an image capture device (not shown), such as a digital camera or a portable scanning device, that uses an image sensor to capture an image of a document. The mobile device 102 is connected with a central server 104 over a network so that the mobile device 102 can transmit captured images, content or other data to the central server 104. In one embodiment, the central server 104 may send information to the mobile device 102 (and specifically an application running on the mobile device) regarding the payment document types, features and other information needed for the mobile device to classify the payment document and extract content from the payment document. The mobile device 102 or the central server 104 may perform additional image processing and data extraction, as will be described in further detail below, in order to determine information about the document and identify the appropriate content. In one embodiment, the central server 104 may be connected with a feature knowledge database 106 which stores information about different payment document types and the features of each type of payment document. The central server 104 may also be connected with a feature extraction database 108 which stores information obtained from the images captured by the mobile device, such as the features, payment document classifications and content. The payment document type, content of the document and other extracted information may then be transmitted to a third party recipient 110, such as a bank or business which is attempting to process the payment indicated on the payment document.

Figure 2:
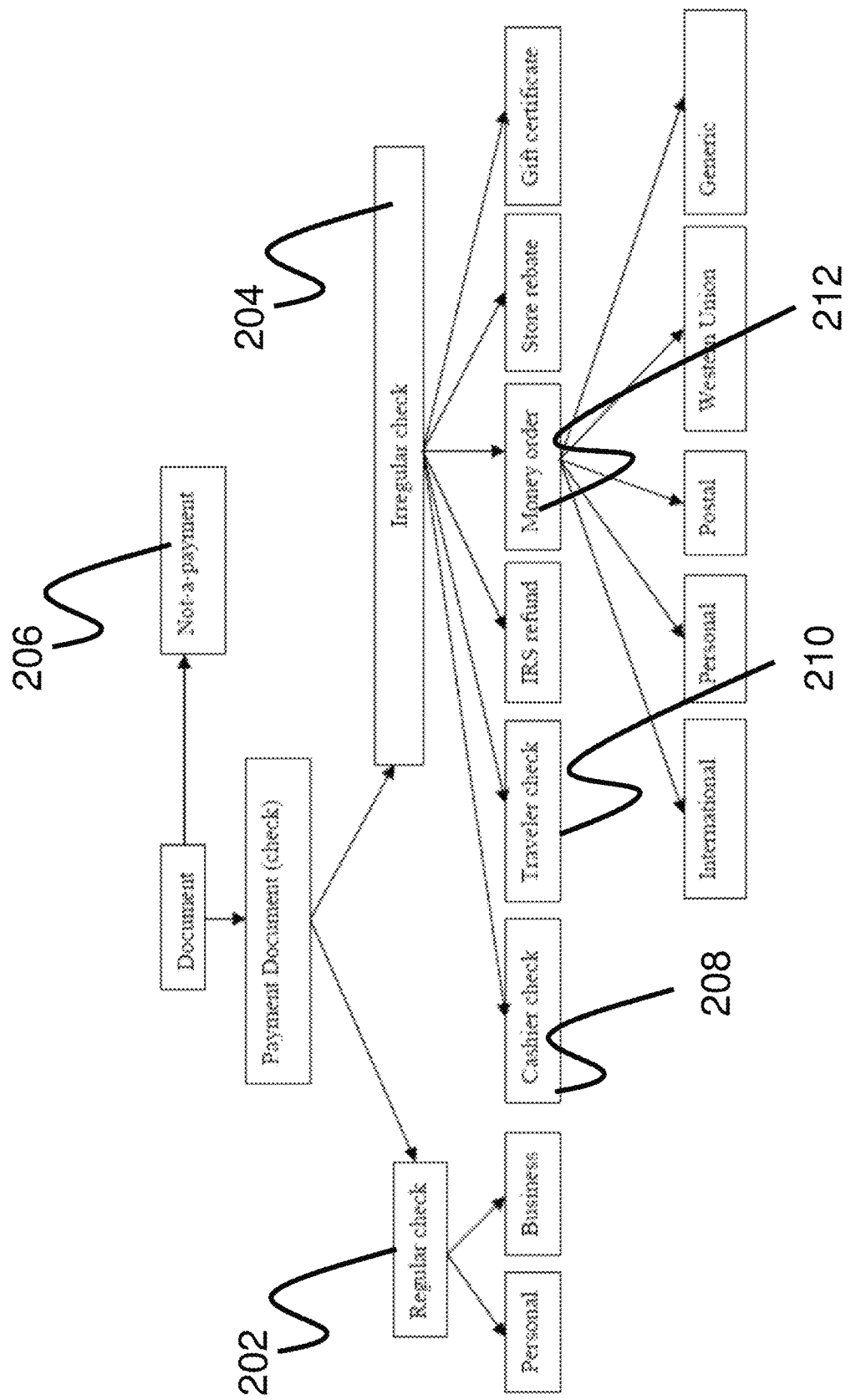
FIG. 2 is a flow diagram of a method of classifying the payment document, according to one exemplary embodiment.

FIG. 2 illustrates a high level flow diagram of a method of classifying the payment document, which depicts how the payment document types may be grouped into overall categories of "regular checks" 202 "irregular checks" 204 or "not-a-payment" 206 documents. A determination is first made as to whether the document is a payment document, after which a document which has been identified as a payment document is classified as either a regular check 202 or an irregular check 204. In one embodiment, personal and business check types comprise the so called "regular" check category, whereas the rest of payment types comprise the so called "irregular" check category. The irregular check categories can be further categorized into specific types or irregular checks, such as cashier's checks 208 or traveler's checks 210. In some instances, even the specific type of irregular checks may have multiple sub-types, as illustrated with the money order 212 in FIG. 2. As will be described further below, these categories may be customized by each user depending on the application and need for identifying certain types of payment documents.

II. Features of Payment Documents

In one embodiment, the system uses prior knowledge about each of the payment document types and includes this into a payment document model stored in the feature knowledge database 106. Each payment document type is characterized according to known information about: 1) the presence of certain image features (such as barcodes, codelines, check numbers, "lock" icons etc); 2) the values of some geometric characteristic of the payment document (such as width, height, aspect ratio etc); 3) the presence of certain keywords (such as "Money Order," "Pay to the order of" or "Cashier's Check"); and 4) cross-validation between certain features which have the same values (such as a check number in an upper right corner and the check number included in a MICR line), etc.

III. Probabilistic Feature Identification

Figure 7:
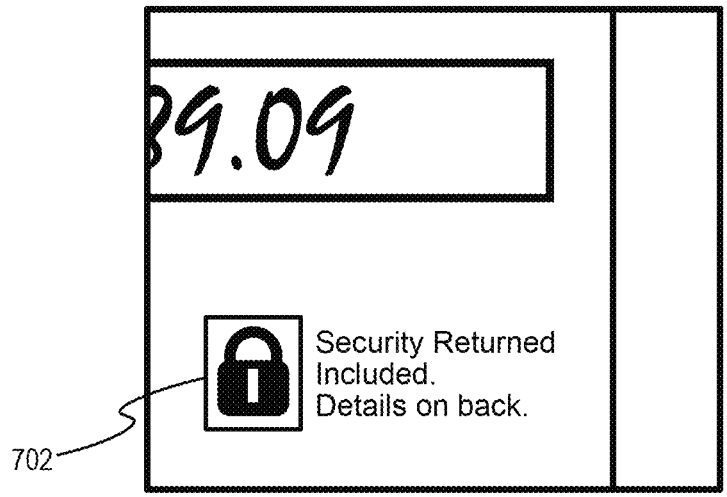
FIG. 7 is an image of a portion of a check depicting the identification of connected components on the payment document, according to one embodiment.

Each feature is described in probabilistic terms, as in the probability that the payment document is a certain type of payment document based on the presence of a certain feature. For example, a "lock" icon (see FIG. 7) has a certain probability (x) of occurrence in personal checks, a second probability (y) of occurrence in a money order, etc. The probability value required to make a definitive determination of a payment document type may vary depending on the particular feature in question, or may be based on a combined probability of several features.

The probabilistic approach helps to build a payment classifier which is both fast and robust to the many distortions that occur in mobile images.

IV. Hierarchical Identification

Figure 3:
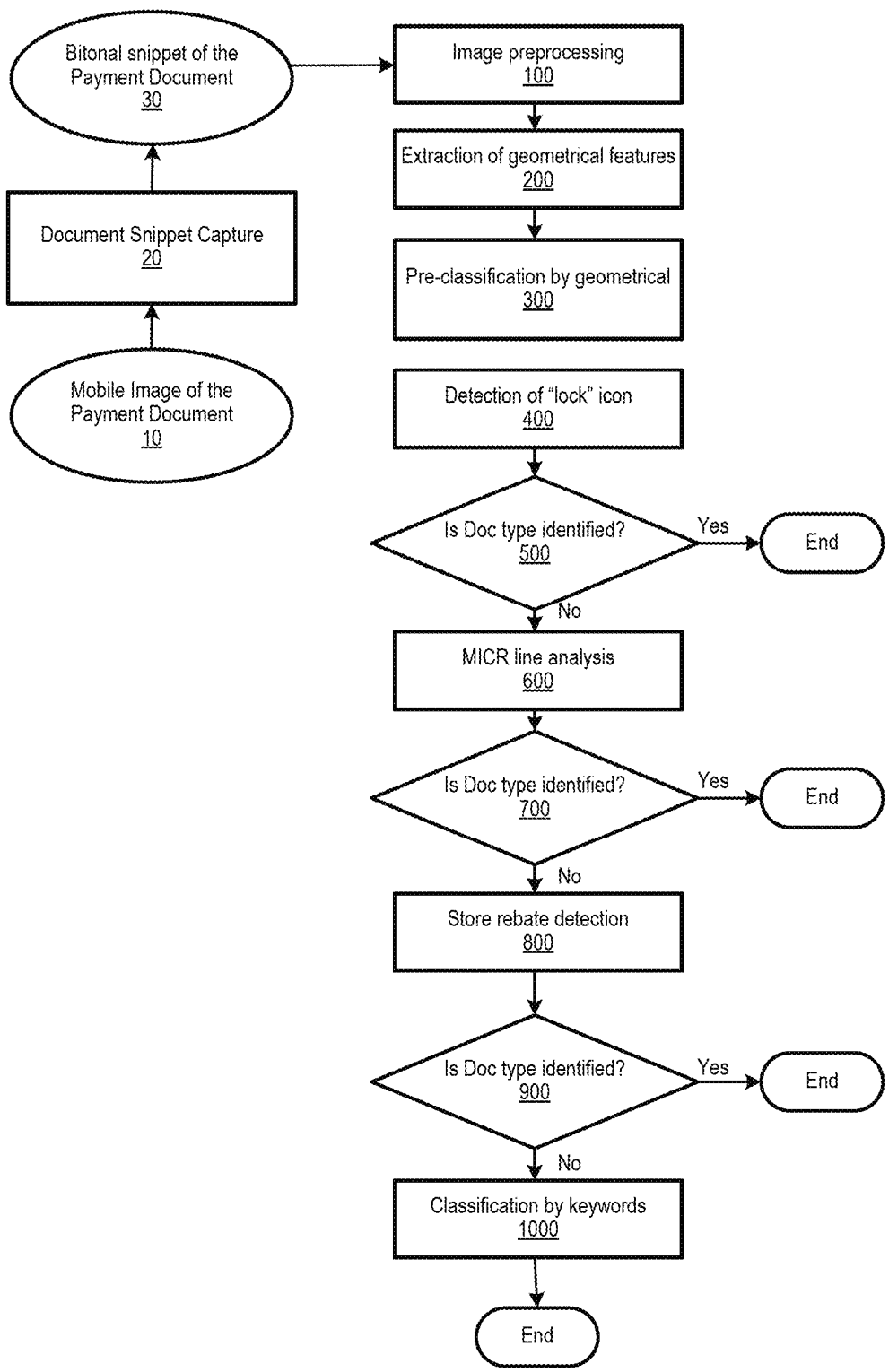
FIG. 3 is a flow diagram of a decision tree for processing an image of a payment document and classifying the payment document, according to one exemplary embodiment.

The system uses document identification logic based on a hierarchical classification algorithm, according to the flowchart in FIG. 3, to perform a specifically-designed series of steps that will determine the payment document type as quickly and accurately as possible. The decision tree starts with easy-to-compute features and tries to make a final, definitive classification as early in the process as possible in order to avoid more time-consuming computation steps later on.

In order to finish the classification process, the system uses known probabilistic distributions of features within the payment document types and between the payment document types. At each decision point (see steps 500, 700 and 900 in FIG. 3), the system matches the features it identified against the feature knowledge database and estimates if the probability of identification is high enough to finish the process. If the probability of the payment document in the mobile-captured images exceeds a certain threshold at one of these decision points, the classification process stops. However, if the final decision of the payment document type cannot be determined at an earlier decision point, the system moves along the decision tree in FIG. 3 towards more time-consuming steps.

As illustrated in FIG. 3, the method may include a first step 10 of receiving a mobile image of the payment document. The mobile image of the payment document may remain on the mobile device for processing at the mobile device itself, or it may be passed on to the central server for processing. In step 20, one or more image processing steps may be performed on the mobile image in order to improve the quality of the image and correct one or more problems with the image caused by the limitations of mobile image capture. In one embodiment, the image processing steps may be those described in U.S. Pat. No. 8,000,514, entitled "Methods for Mobile Image Capture and Processing of Checks," the content of which is incorporated herein in its entirety. The image processing may also crop the image to display only the portion of the image which includes the payment document. A third step 30 of creating a bitonal image of the cropped and corrected image may then be carried out in order to improve the readability of the payment document by a content recognition process such as OCR.

The cropped, corrected and binarized image may then be provided for the hierarchical classification steps, as will be described in detail immediately below.

Image Preprocessing

Figure 4:
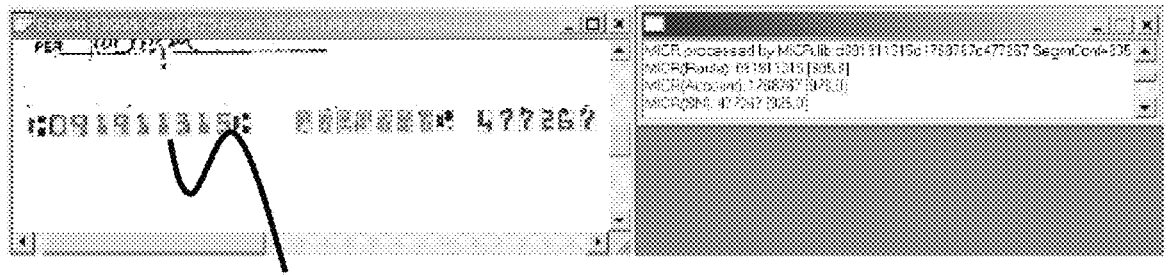
FIG. 4 is an image of a MICR line which is detected in the process of classifying the payment document, according to one embodiment of the invention.
Figure 5:
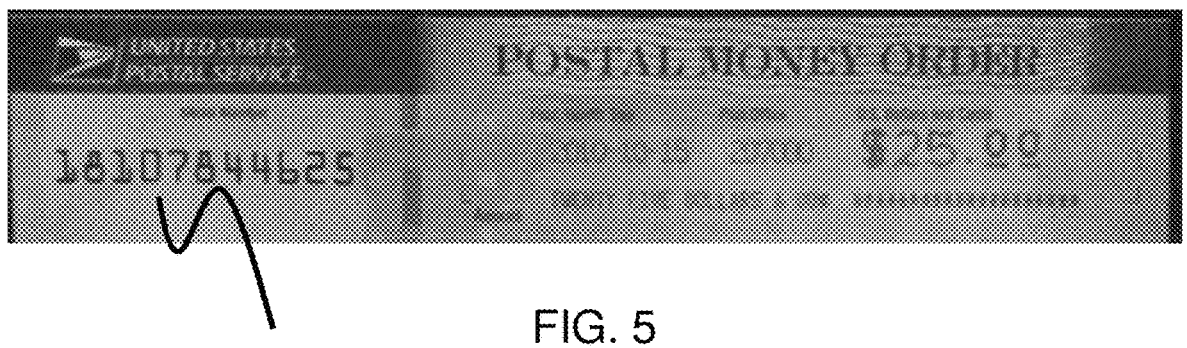
FIG. 5 is an image of a money order with an OCRA codeline that can be detected for classifying the payment document, according to one embodiment of the invention.

The hierarchical classification begins with an image preprocessing step 100. In this step, the image is processed in order to extract all features needed to classify the payment document type. Examples of features that may be identified are listed below, although one of skill in the art will appreciate that other features may be identified and used to determine payment document types. Image pre-processing may include the following operations:

1. Finding and reading of a magnetic ink character recognition ("MICR") line 402, as illustrated in FIG. 4.
2. Finding and reading of an optical character recognition type A ("OCR-A") codeline 502, as illustrated in FIG. 5.

Figure 6:
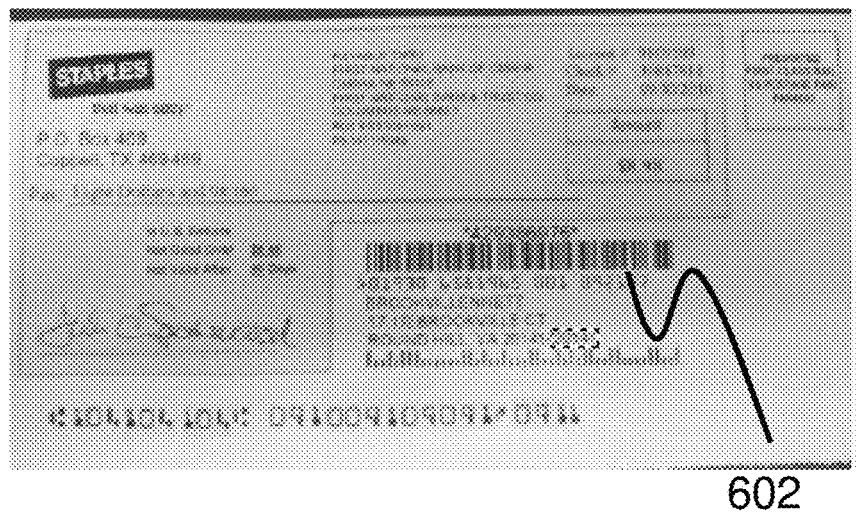
FIG. 6 is an image of a rebate check with a barcode which can be detected, parsed and read for classifying the payment document, according to one embodiment of the invention.
Figure 8:
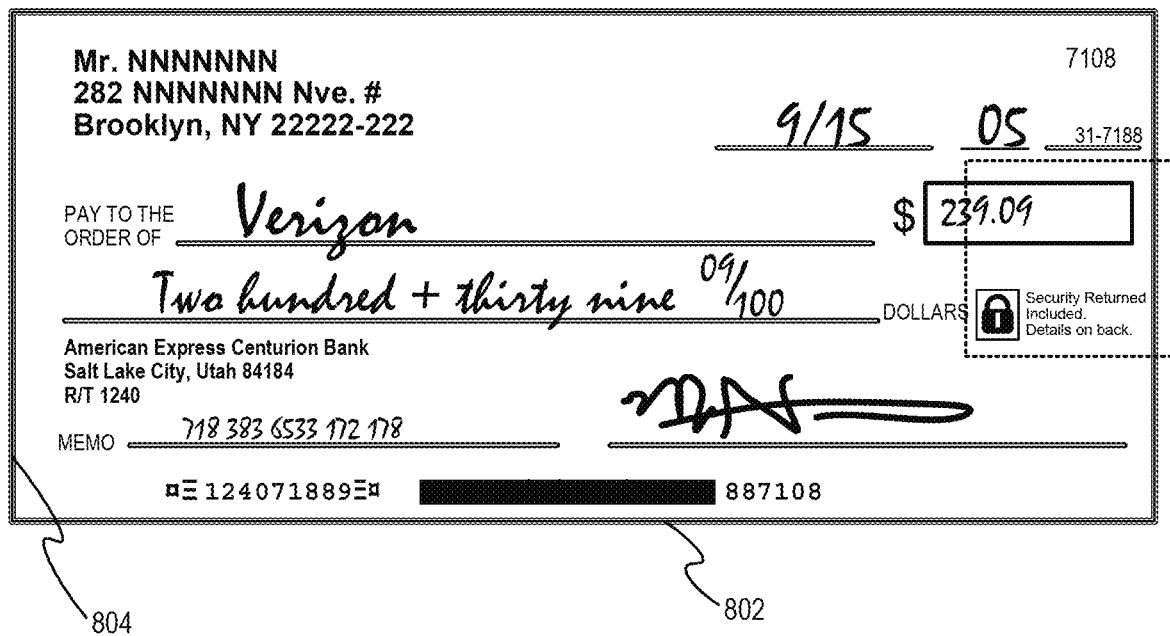
FIG. 8 is an image of a check where an image processing step has identified horizontal and vertical lines, according to one embodiment of the invention.
Figure 9:
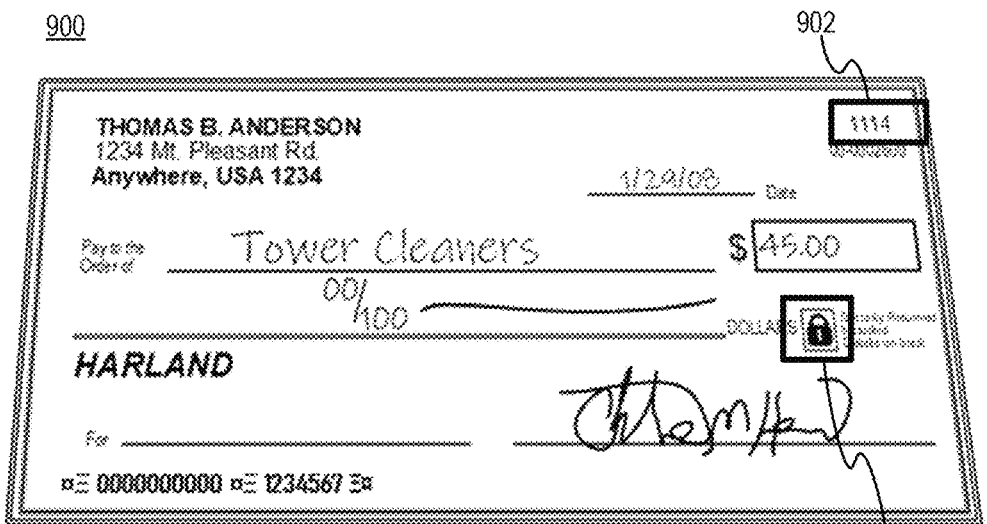
FIG. 9 is an image of a check where a check number and a lock icon have been identified on the check, according to one embodiment of the invention.
Figure 10:
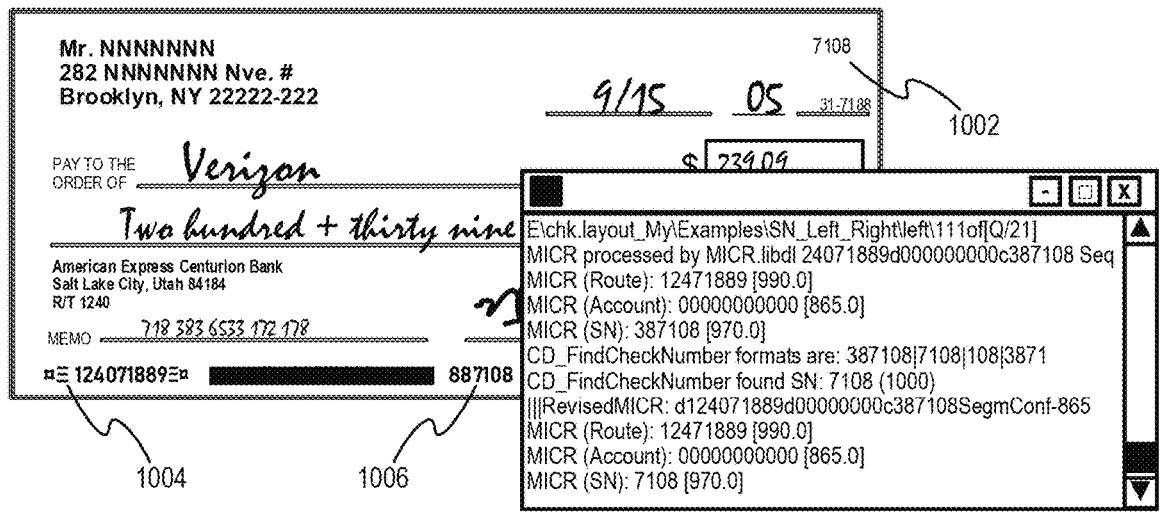
FIG. 10 is an image of a check where a cross-validation process is carried out to match the check number in one location of the check with the check number located in the MICR line, according to one embodiment of the invention.

3. Finding one or more barcodes 602, as illustrated in FIG. 6.
4. Finding one or more image elements, such as connected components 702 (FIG. 7), horizontal lines 802 and vertical lines 804 (FIG. 8), a check number 902 in a top-right quadrant of the image 900 (FIG. 9) and a "lock" icon 904 in a middle-right side of the image 900. A connected component (CC) is a group of mutually adjacent (connected) pixels on the image which is separated from the rest of the image. Usually, each character is represented by one CC (except for 'I' and 'j' which may have 2 CCs). If a character is broken due to imaging deficiencies, it's represented by 2 or more CCs.
5. Performing a cross-validation and possible correction of the check number 1002 extracted from the MICR-line 1004 against the check number 1006 found in the upper right corner of image 1000, as illustrated in FIG. 10. This information is used in decision making steps described further herein.

Extracting Geometric Features

In step 200, geometric image characteristics of the payment document may be determined, such as a width, height and aspect ratio. This step also provides the ability to estimate possible positions of the "lock" icon 904 and barcode line 602 by grouping found connected components. The system uses the size, alignment and adjacency characteristics to detect the "lock" icon and barcode. For example, a barcode contains at least N connected components, which are closer than Y pixels to each other and have height-to-width ration of at least Z.

Pre-Classification Using Geometric Features

In step 300, the geometrical features identified in step 200 are analyzed in order to narrow down the subset of possible document types. This step filters and eliminates inapplicable document types using geometrical characteristics of the given image. For instance, business checks are wider than personal checks; personal checks differ from most irregular check types by aspect ratio, etc.

Lock Icon Detection—First Decision Point

In step 400, the system looks for the "lock" icon 904 on the image in the areas where it is typically found on a personal check, cashier's check and money order. The results of the geometric feature extraction 200 helps identify the possible search areas for the lock icon 904. The "lock" detection is based on a technique designed for "lock" classification. The lock detection technique is a symbol recognition technique similar to the one used to recognize MICR-characters. It is based on a comparison of connected components (potential location of "lock") against several hundred template images (from a training data base). The result of the lock icon detection 400 includes a set of found alternative lock positions within the image. These positions can then be compared with the known positions of the lock icon in different payment document types to hopefully determine the payment document type at this stage in the process.

At step 500, if the "lock" icon has been found in step 400 above and its position has been matched with a payment document type or types, the identification process is completed. Otherwise, further analysis is needed. In one embodiment, a standard Bayesian model is used for developing the probabilistic approach.

MICR Line Analysis—Second Decision Point

Figure 11:
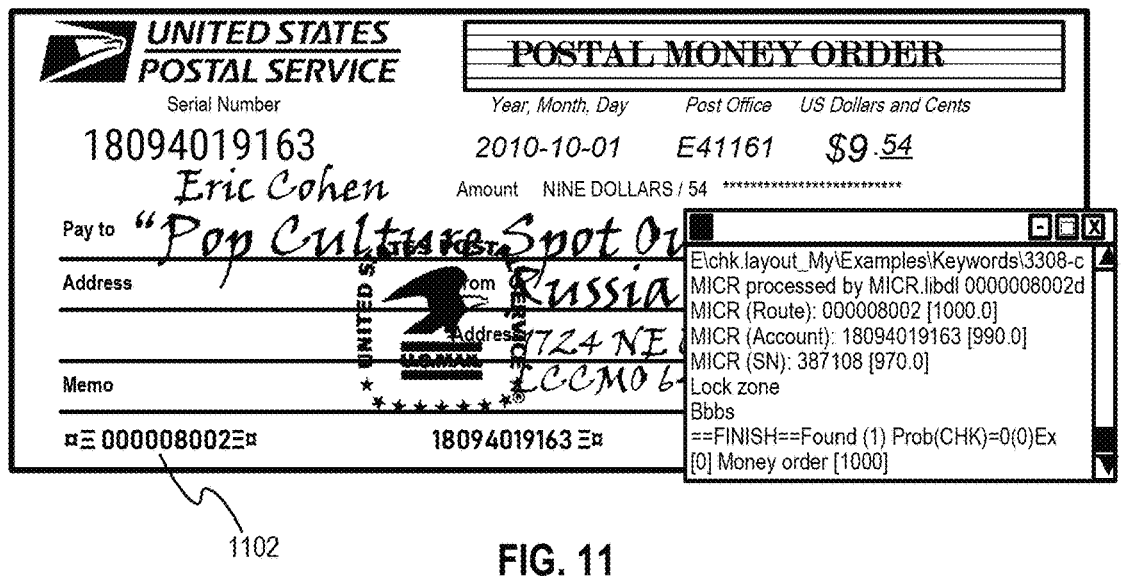
FIG. 11 is an image of a money order where the MICR line is parsed and analyzed in order to classify the type of check, according to one exemplary embodiment.

In step 600, if the document was not identified by the lock icon detection decision point 500, the process tries to complete identification by finding unique values and/or positions of the MICR line components 1102 that may be present in each document type, as illustrated in FIG. 11. The MICR-line analysis attempts to reduce a number of hypotheses for the payment document type. Each document type has its own type-specific MICR properties, presence or lack of which is used in this step. For example, more than 99% of personal checks will have the check number in the MICR line, whereas other types of payment are much less likely to have it. This information is built into the probabilistic model which is used at every decision-making step In step 700, if the MICR line analysis provides a sufficient probability that the payment document is a specific type, the classification process is complete. If not, more detailed analysis is needed.

Store Rebate Detection—Third Decision Point

Figure 12:
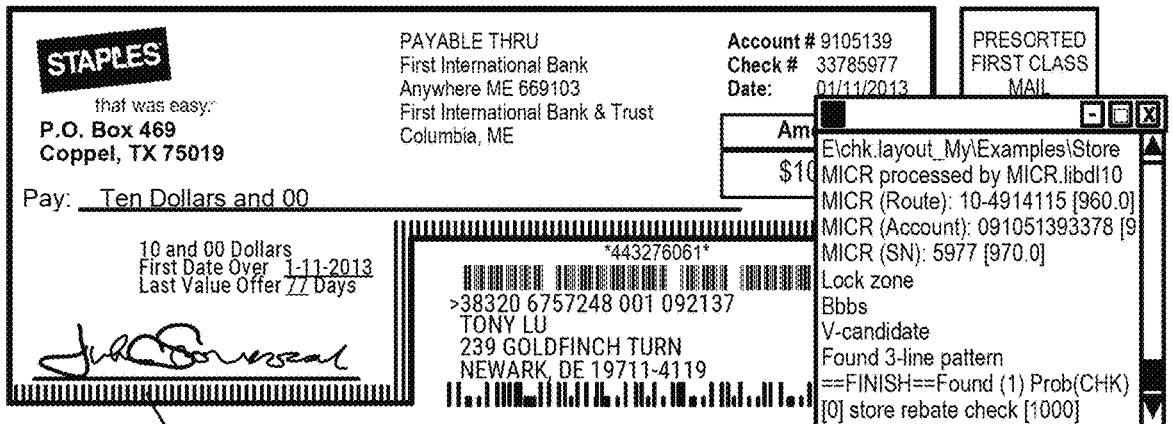
FIG. 12 is an image of a rebate form which is identified by finding linear patterns on the document, according to one exemplary embodiment.
Figure 13:
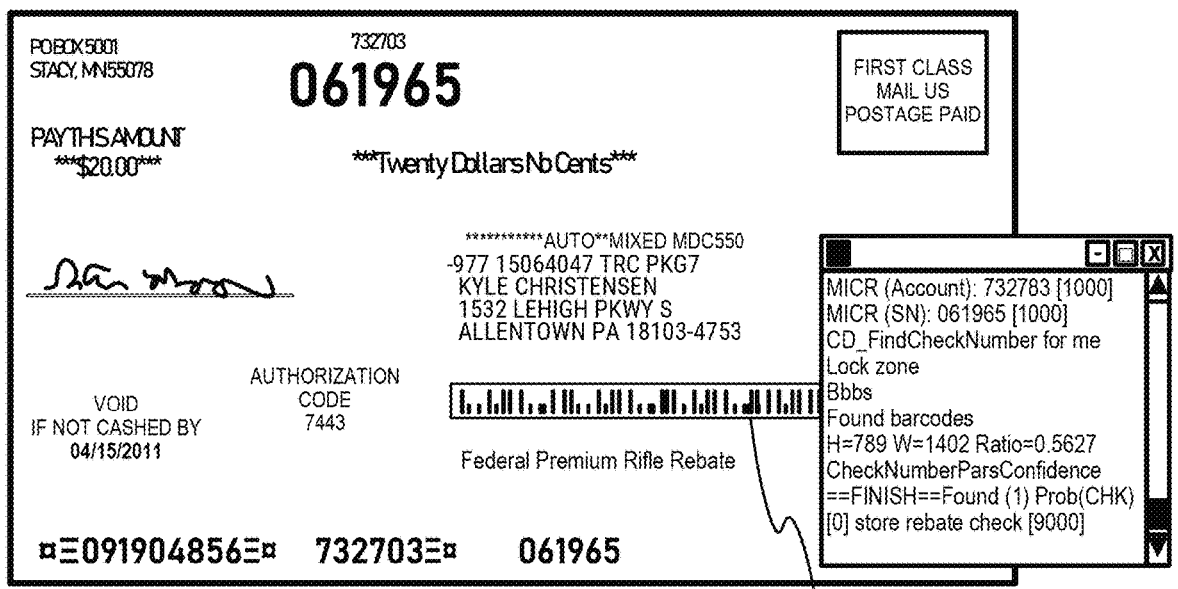
FIG. 13 is an image of a rebate form which is identified by finding a one-dimensional barcode on the document, according to one exemplary embodiment.

In step 800, the payment document is analyzed to find specific linear patterns 1202 indicated by the dashed line along a bottom edge of the rebate check 1200 in FIG. 12, or unique one-dimensional bar codes 1302 in FIG. 13 which are known to occur in a store rebate check 1300.

In step 900, if one or more of the aforementioned patterns were found and geometrical features confirm the patterns, the classification process is complete. If not, more detailed analysis is needed.

Keyword Classification

Figure 14A:
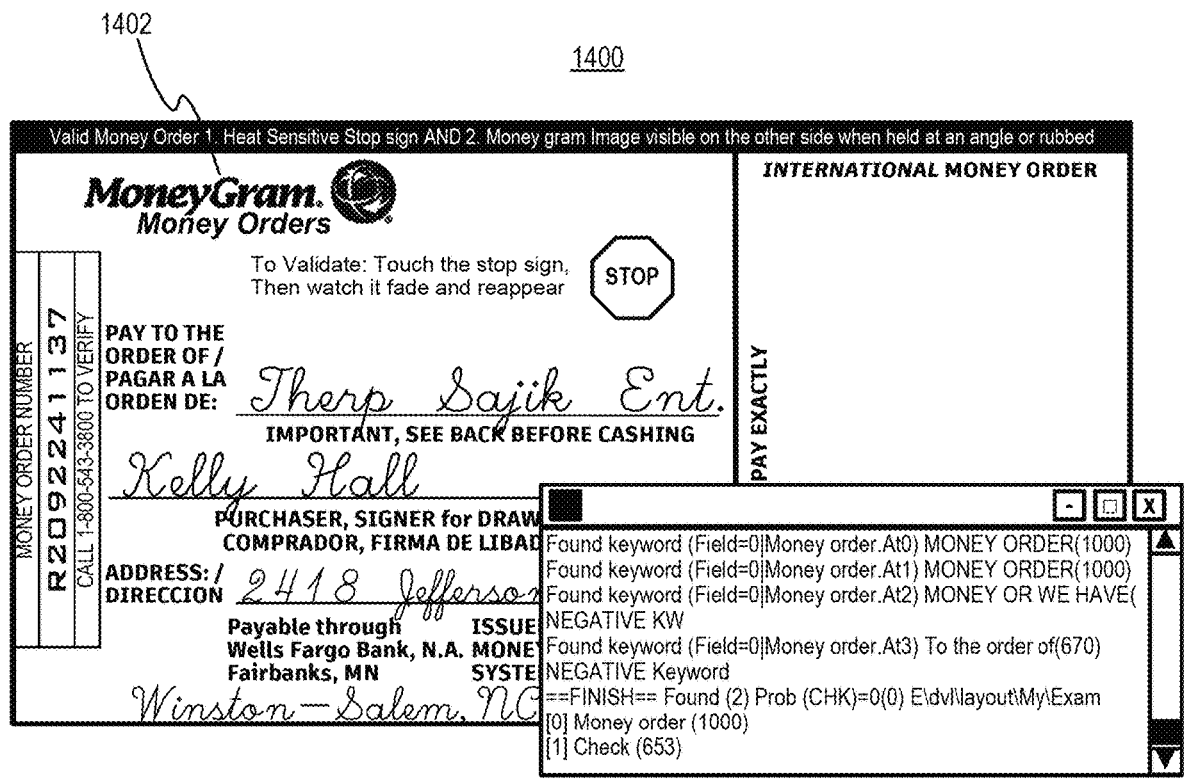
FIG. 14A is an image of a money order which is identified by finding a keyword on the payment document, according to one embodiment of the invention.
Figure 14B:
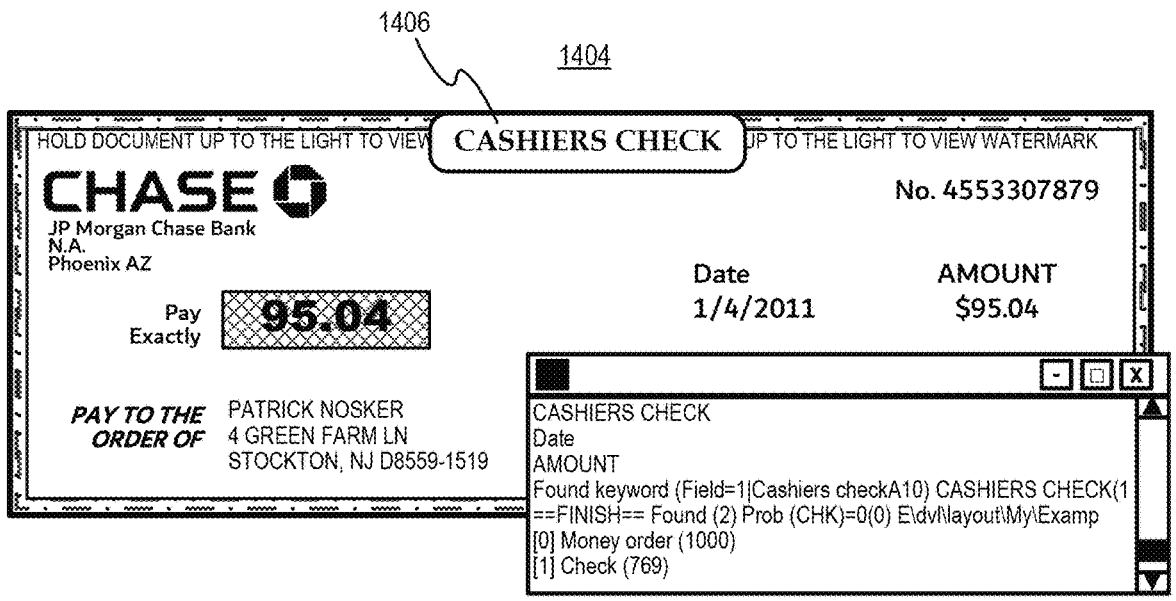
FIG. 14B is an image of a cashier's check which is identified by finding a keyword on the payment document, according to one embodiment of the invention.

If none of the above steps have been able to classify the payment document, keyword classification is performed in step 1000 by performing optical character recognition (OCR) on the payment document and analyzing words and phrases to determine a payment document type. This is the slowest classification step since it uses OCR, which is why it is performed only at the end of the classification process and only if other classification steps have failed. Keyword classification looks for predefined keywords that are known to appear on different payment document types, such as the word "money order" 1402 on the money order 1400 in FIG. 14A, or the word "cashier's check" 1406 on the cashier's check 1408 in FIG. 14B. Other phrases such as "pay to the order of" may be used simply to determine if the payment document is a payment document or a non-payment document. If one of preconfigured keywords was found, the payment document is classified according to the corresponding document type, and the classification process stops.

If the keyword classification step 1000 fails to identify the document, the classification algorithm outputs a full set of hypotheses for each of the decision points listed above which correspond to the previous classification stages. The output of the hypotheses may provide insight into the type of payment document based on the determined probabilities in relation to each other.

V. User-Specific Configurations

The classification algorithm is adjustable and flexible enough to match a user's preferences, such as which document types should be distinguished and which should be placed to the same terminal category, according to the document models above. For instance, the user can configure the algorithm to classify an IRS refund check as a "Regular Check," or configure it to ignore differences between Cashier's Checks and Traveler's Checks by placing them into the same output category.

In one embodiment, differentiating between types of checks provides additional information to a bank being asked to deposit the check as to the potential risk of the check being fraudulent. The risk of fraudulent checks varies depending on the type of check, and so a bank can set up customized rules for each type of check that it may receive during a mobile deposit process. If the check type is one that is commonly associated with fraud, the bank may immediately deny the request, or request additional processing of the check image before deciding whether to deposit the check. The user is sent a message if the deposit is denied, and may be provided with instructions to manually deposit the check so that the bank can review the original check.

VI. Computer-Implemented Embodiment

Figure 15:
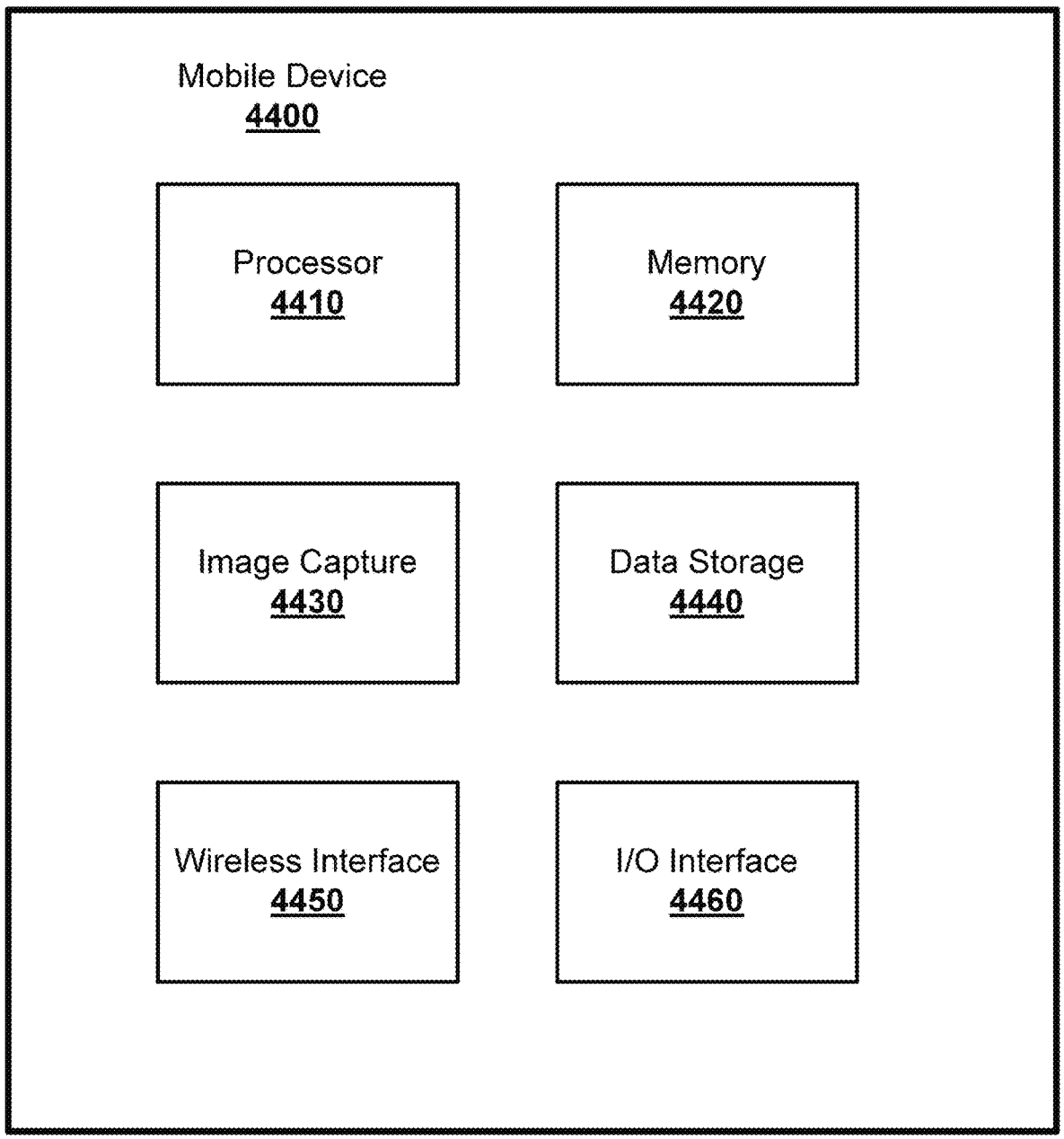
FIG. 15 is a block diagram of various functional elements of a mobile device that can be used with the various systems and methods described herein, according to one embodiment.

FIG. 15 is an exemplary embodiment of a mobile device 4400 according to an embodiment. Mobile device 4400 can be used to implement the mobile device 102 of FIG. 1. Mobile device 4200 includes a processor 4410. The processor 4410 can be a microprocessor or the like that is configurable to execute program instructions stored in the memory 4420 and/or the data storage 4440. The memory 4420 is a computer-readable memory that can be used to store data and or computer program instructions that can be executed by the processor 4410. According to an embodiment, the memory 4420 can comprise volatile memory, such as RAM and/or persistent memory, such as flash memory. The data storage 4440 is a computer readable storage medium that can be used to store data and or computer program instructions. The data storage 4440 can be a hard drive, flash memory, a SD card, and/or other types of data storage.

The mobile device 4400 also includes an image capture component 4430, such as a digital camera. According to some embodiments, the mobile device 4400 is a mobile phone, a smart phone, or a PDA, and the image capture component 4430 is an integrated digital camera that can include various features, such as auto-focus and/or optical and/or digital zoom. In an embodiment, the image capture component 4430 can capture image data and store the data in memory 4220 and/or data storage 4440 of the mobile device 4400.

Wireless interface 4450 of the mobile device can be used to send and/or receive data across a wireless network. For example, the wireless network can be a wireless LAN, a mobile phone carrier's network, and/or other types of wireless network.

I/O interface 4460 can also be included in the mobile device to allow the mobile device to exchange data with peripherals such as a personal computer system. For example, the mobile device might include a USB interface that allows the mobile to be connected to USB port of a personal computer system in order to transfers information such as contact information to and from the mobile device and/or to transfer image data captured by the image capture component 4430 to the personal computer system.

As used herein, the term unit might describe a given unit of functionality that can be performed in accordance with one or more embodiments of the present invention. As used herein, a unit might be implemented utilizing any form of hardware, software, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of processes used in conjunction with the operations described herein are implemented in whole or in part using software, in one embodiment, these software elements can be implemented to operate with a computing or processing module capable of carrying out the functionality described with respect thereto. One such example-computing module is shown in FIG. 16, which illustrates a computer system that can be used to implement mobile image payment document classification system, according to an embodiment.

Various embodiments are described in terms of this example-computing module 1900. After reading this description, it will become apparent to a person skilled in the relevant art how to implement the invention using other computing modules or architectures.

Figure 16:
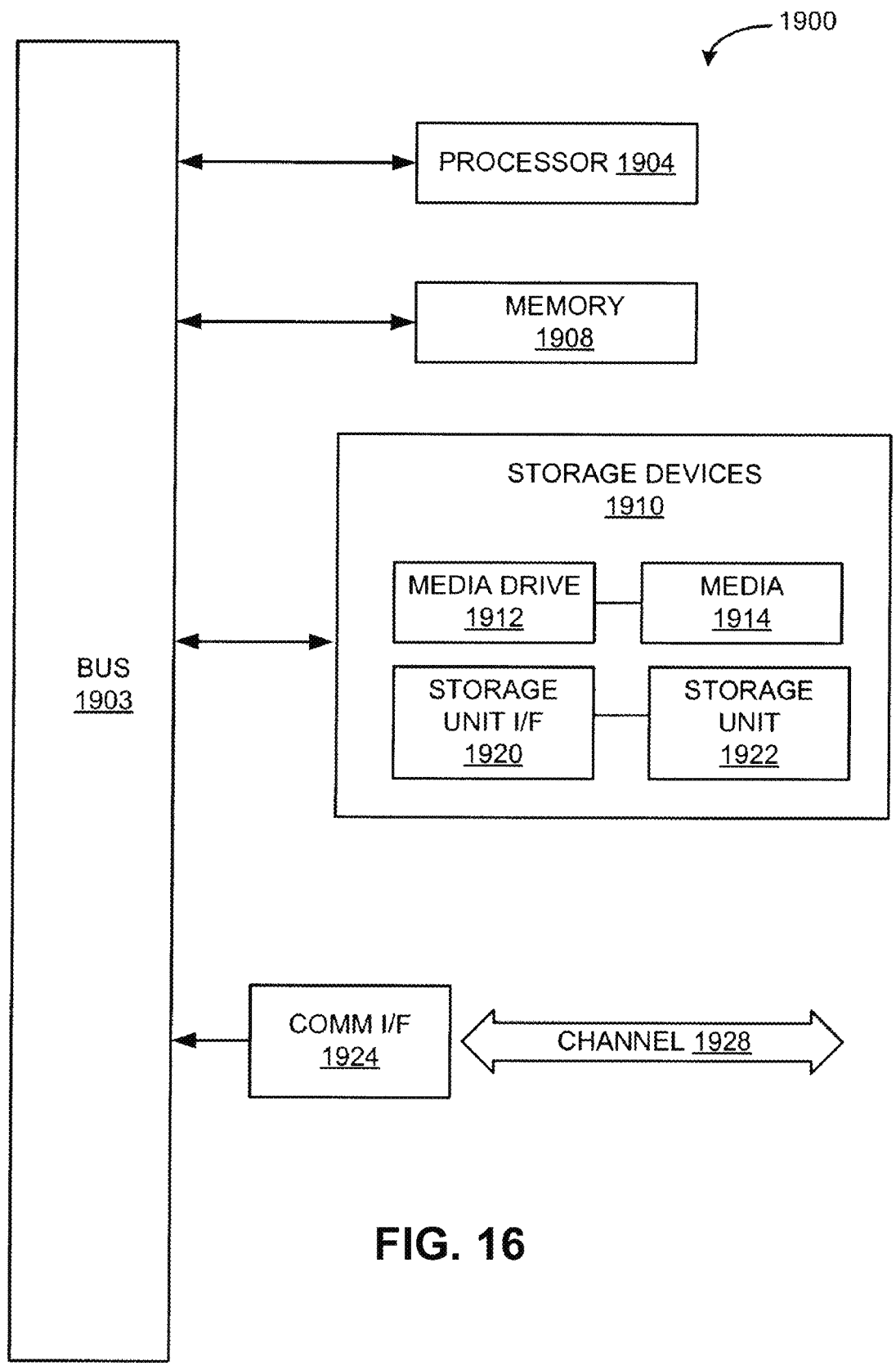
FIG. 16 is a block diagram of functional elements of a computer system that can be used to implement the mobile device and/or the servers described in the systems and methods disclosed herein.

Referring now to FIG. 16, computing module 1900 may represent, for example, computing or processing capabilities found within desktop, laptop and notebook computers; mainframes, supercomputers, workstations or servers; or any other type of special-purpose or general-purpose computing devices as may be desirable or appropriate for a given application or environment. Computing module 1900 might also represent computing capabilities embedded within or otherwise available to a given device. For example, a computing module might be found in other electronic devices. Computing module 1900 might include, for example, one or more processors or processing devices, such as a processor 1904. Processor 1904 might be implemented using a general-purpose or special-purpose processing engine such as, for example, a microprocessor, controller, or other control logic.

Computing module 1900 might also include one or more memory modules, referred to as main memory 1908. For example, random access memory (RAM) or other dynamic memory might be used for storing information and instructions to be executed by processor 1904. Main memory 1908 might also be used for storing temporary variables or other intermediate information during execution of instructions by processor 1904. Computing module 1900 might likewise include a read only memory ("ROM") or other static storage device coupled to bus 1902 for storing static information and instructions for processor 1904.

The computing module 1900 might also include one or more various forms of information storage mechanism 1910, which might include, for example, a media drive 1912 and a storage unit interface 1920. The media drive 1912 might include a drive or other mechanism to support fixed or removable storage media 1914. For example, a hard disk drive, a floppy disk drive, a magnetic tape drive, an optical disk drive, a CD or DVD drive (R or RW), or other removable or fixed media drive. Accordingly, storage media 1914 might include, for example, a hard disk, a floppy disk, magnetic tape, cartridge, optical disk, a CD or DVD, or other fixed or removable medium that is read by, written to or accessed by media drive 1912. As these examples illustrate, the storage media 1914 can include a computer usable storage medium having stored therein particular computer software or data.

In alternative embodiments, information storage mechanism 1910 might include other similar instrumentalities for allowing computer programs or other instructions or data to be loaded into computing module 1900. Such instrumentalities might include, for example, a fixed or removable storage unit 1922 and an interface 1920. Examples of such storage units 1922 and interfaces 1920 can include a program cartridge and cartridge interface, a removable memory (for example, a flash memory or other removable memory module) and memory slot, a PCMCIA slot and card, and other fixed or removable storage units 1922 and interfaces 1920 that allow software and data to be transferred from the storage unit 1922 to computing module 1900.

Computing module 1900 might also include a communications interface 1924. Communications interface 1924 might be used to allow software and data to be transferred between computing module 1900 and external devices. Examples of communications interface 1924 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1924 might typically be carried on signals, which can be electronic, electromagnetic (which includes optical) or other signals capable of being exchanged by a given communications interface 1924. These signals might be provided to communications interface 1924 via a channel 1928. This channel 1928 might carry signals and might be implemented using a wired or wireless communication medium. These signals can deliver the software and data from memory or other storage medium in one computing system to memory or other storage medium in computing system 1900. Some examples of a channel might include a phone line, a cellular link, an RF link, an optical link, a network interface, a local or wide area network, and other wired or wireless communications channels.

Computing module 1900 might also include a communications interface 1924. Communications interface 1924 might be used to allow software and data to be transferred between computing module 1900 and external devices. Examples of communications interface 1924 might include a modem or softmodem, a network interface (such as an Ethernet, network interface card, WiMAX, 802.XX or other interface), a communications port (such as for example, a USB port, IR port, RS232 port, Bluetooth interface, or other port), or other communications interface. Software and data transferred via communications interface 1924 might typically be carried on signals, which can be electronic, electromagnetic, optical or other signals capable of being exchanged by a given communications interface 1924. These signals might be provided to communications interface 1924 via a channel 1928. This channel 1928 might carry signals and might be implemented using a wired or wireless medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to physical storage media such as, for example, memory 1908, storage unit 1920, and media 1914. These and other various forms of computer program media or computer usable media may be involved in storing one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1900 to perform features or functions of the present invention as discussed herein.

While various embodiments of the present invention have been described above, it should be understood that they have been presented by way of example only, and not of limitation. The breadth and scope of the present invention should not be limited by any of the above-described exemplary embodiments. Where this document refers to technologies that would be apparent or known to one of ordinary skill in the art, such technologies encompass those apparent or known to the skilled artisan now or at any time in the future. In addition, the invention is not restricted to the illustrated example architectures or configurations, but the desired features can be implemented using a variety of alternative architectures and configurations. As will become apparent to one of ordinary skill in the art after reading this document, the illustrated embodiments and their various alternatives can be implemented without confinement to the illustrated example. One of ordinary skill in the art would also understand how alternative functional, logical or physical partitioning and configurations could be utilized to implement the desired features of the present invention.

Furthermore, although items, elements or components of the invention may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising using at least one hardware processor to:
   receive an image to be classified as one of a plurality of types of payment document; and
   extract one or more features from the image, wherein the one or more features comprise at least one geometric characteristic of the image, and wherein the at least one geometric characteristic of the image comprises an aspect ratio; and
   classify the image using a classification algorithm that comprises a plurality of classifiers, wherein the plurality of classifiers include at least a first classifier and a second classifier that requires a more time-consuming computation than the first classifier, wherein at least one of the plurality of classifiers eliminates one or more of the plurality of types of payment document based on the aspect ratio, and wherein classifying the image comprises,
   prior to executing the second classifier, executing the first classifier,
   when the first classifier classifies the image as one of the plurality of types of payment document with a probability that exceeds a threshold, classifying the image as the certain one type of payment document without executing the second classifier, and,
   when the first classifier is unable to classify the image as one of the plurality of types of payment document with a probability that exceeds the threshold, executing the second classifier.

2. The method of claim 1, further comprising using the at least one hardware processor to, before classifying the image, crop, correct, and binarize the image.

3. The method of claim 1, wherein the one or more features comprise a magnetic ink character recognition (MICR) line.

4. The method of claim 1, wherein the one or more features comprise an optical character recognition type A (OCR-A) codeline.

5. The method of claim 1, wherein the one or more features comprise a barcode.

6. The method of claim 1, wherein the one or more features comprise a check number.

7. The method of claim 1, wherein the one or more features comprise a lock icon.

8. The method of claim 1, wherein at least one of the plurality of classifiers:
determines a position of a component in the image; and
compares the determined position of the component to known positions of the component in one or more of the plurality of types of payment document to identify at least one of the plurality of types of payment document for which the known position matches the determined position.

9. The method of claim 8, wherein the component is a lock icon.

10. The method of claim 1, wherein at least one of the plurality of classifiers:
identifies a magnetic ink character recognition (MICR) line in the image; and
determines a probability that the image is of one or more of the plurality of types of payment document based on one or more characteristics of the MICR line.

11. The method of claim 1, wherein at least one of the plurality of classifiers identifies a specific linear pattern, associated with one of the plurality of types of payment document, in the image.

12. The method of claim 1, wherein the second classifier:
performs optical character recognition on the image to recognize one or more character strings; and
analyzes the one or more character strings to classify the image.

13. The method of claim 1, wherein the plurality of types of payment document comprises a personal check, a business check, and one or more categories of irregular check.

14. The method of claim 1, wherein the first classifier does not utilize keywords obtained by optical character recognition (OCR) performed on the image, and wherein the second classifier does utilize keywords obtained by OCR performed on the image.

15. A system comprising:
at least one hardware processor; and
one or more software modules that are configured to, when executed by the at least one hardware processor,
receive an image to be classified as one of a plurality of types of payment document,
extract one or more features from the image, wherein the one or more features comprise at least one geometric characteristic of the image, and wherein the at least one geometric characteristic of the image comprises an aspect ratio, and
classify the image using a classification algorithm that comprises a plurality of classifiers, wherein the plurality of classifiers include at least a first classifier and a second classifier that requires a more time-consuming computation than the first classifier, wherein at least one of the plurality of classifiers eliminates one or more of the plurality of types of payment document based on the aspect ratio, and wherein classifying the image comprises,
prior to executing the second classifier, executing the first classifier,
when the first classifier classifies the image as one of the plurality of types of payment document with a probability that exceeds a threshold, classifying the image as the certain one type of payment document without executing the second classifier, and,
when the first classifier is unable to classify the image as one of the plurality of types of payment document with a probability that exceeds the threshold, executing the second classifier.

16. A non-transitory computer-readable medium having instructions stored thereon, wherein the instructions, when executed by a processor, cause the processor to:
receive an image to be classified as one of a plurality of types of payment document;
extract one or more features from the image, wherein the one or more features comprise at least one geometric characteristic of the image, and wherein the at least one geometric characteristic of the image comprises an aspect ratio; and
classify the image using a classification algorithm that comprises a plurality of classifiers, wherein the plurality of classifiers include at least a first classifier and a second classifier that requires a more time-consuming computation than the first classifier, wherein at least one of the plurality of classifiers eliminates one or more of the plurality of types of payment document based on the aspect ratio, and wherein classifying the image comprises,
prior to executing the second classifier, executing the first classifier,
when the first classifier classifies the image as one of the plurality of types of payment document with a probability that exceeds a threshold, classifying the image as the certain one type of payment document without executing the second classifier, and,
when the first classifier is unable to classify the image as one of the plurality of types of payment document with a probability that exceeds the threshold, executing the second classifier.

* * * * *